(12) United States Patent
Lourdel et al.

(10) Patent No.: US 12,331,848 B2
(45) Date of Patent: Jun. 17, 2025

(54) TOP ENTRY VALVE FOR SEVERE INDUSTRIAL APPLICATIONS

(71) Applicant: Velan Inc., Montreal (CA)

(72) Inventors: Nicolas Hervé François Lourdel, Montreal (CA); Michel Sylvain Mario Paquin, Sainte-Cecile de Milton (CA); Fadila Khelfaoui, Montreal (CA); Luc David Vernhes, Hampstead (CA); Vinh Van Nguyen, Houston, TX (US); Duc Thanh Tran, Montreal (CA)

(73) Assignee: Velan Inc., Montreal (CA)

( * ) Notice: Subject to any disclaimer, the term of this patent is extended or adjusted under 35 U.S.C. 154(b) by 148 days.

(21) Appl. No.: 17/985,474

(22) Filed: Nov. 11, 2022

(65) Prior Publication Data

US 2023/0074937 A1 Mar. 9, 2023

Related U.S. Application Data

(63) Continuation-in-part of application No. 17/921,528, filed as application No. PCT/IB2021/053479 on Apr. 27, 2021.

(Continued)

(51) Int. Cl.
*F16K 5/06* (2006.01)
*F16K 5/20* (2006.01)
(Continued)

(52) U.S. Cl.
CPC ............ *F16K 5/0636* (2013.01); *F16K 5/201* (2013.01); *F16K 27/067* (2013.01);
(Continued)

(58) Field of Classification Search
CPC .... F16K 27/067; F16K 5/0636; F16K 5/0657; F16K 5/0689; F16K 5/0694; F16K 27/12;
(Continued)

(56) References Cited

U.S. PATENT DOCUMENTS 3,122,352 A 2/1964 Anderson et al.
3,542,331 A * 11/1970 Canalizo ............... F16K 5/0647
251/14

(Continued)

FOREIGN PATENT DOCUMENTS

| CN | 2597783 | | 1/2004 | |
| GB | 2182758 A | * | 5/1987 | ........... F16K 25/005 |
| KR | 10-2006-0058081 | | 5/2006 | |

OTHER PUBLICATIONS

International Search Report for PCT/IB2021/053479 dated Jul. 28, 2021, 4 pages.

(Continued)

*Primary Examiner* — Marina A Tietjen

(57) ABSTRACT

A two-piece valve shell (body and bolted-on top bonnet having external fins to dissipate heat) structure reduces possible leakage paths while also providing a top-side ball/stem installation/removal path (when the bonnet piece is not present) to facilitate initial valve assembly as well as subsequent inspection/removal of the ball/stem and other valve internals for conducting valve maintenance without requiring the valve body to be removed from its process connections. In some implementations, a second/bottom bonnet is also attached to the body such that it covers another opening to the ball cavity.

18 Claims, 20 Drawing Sheets

Related U.S. Application Data

(60) Provisional application No. 63/016,423, filed on Apr. 28, 2020.

(51) Int. Cl.
*F16K 27/06* (2006.01)
*F16K 37/00* (2006.01)
*F16K 41/02* (2006.01)

(52) U.S. Cl.
CPC ........ *F16K 37/0041* (2013.01); *F16K 37/005* (2013.01); *F16K 41/026* (2013.01)

(58) Field of Classification Search
CPC .. F16K 41/003; F16K 5/0605; F16K 37/0041; F16K 5/22–227; F16K 41/026; F16K 5/201; Y02P 10/20
See application file for complete search history.

(56) References Cited

U.S. PATENT DOCUMENTS

| | | |
|---|---|---|
| 4,281,819 A | 8/1981 | Linder |
| 4,292,989 A | 10/1981 | Cazzaniga et al. |
| 4,388,945 A | 6/1983 | Johnson et al. |
| 4,566,482 A | 1/1986 | Stunkard |
| 5,056,758 A | 10/1991 | Bramblet |
| 2009/0302253 A1* | 12/2009 | Ko .................. F16K 1/42 251/359 |
| 2016/0109035 A1 | 4/2016 | McCarty |
| 2016/0356384 A1 | 12/2016 | Jackson |

OTHER PUBLICATIONS

Written Opinion of the ISA for PCT/IB2021/053479 dated Jul. 28, 2021, 9 pages.

* cited by examiner

TOP ENTRY VALVE FOR SEVERE INDUSTRIAL APPLICATIONS

CROSS-REFERENCES TO RELATED APPLICATIONS

This application is a continuation-in-part of U.S. application Ser. No. 17/921,528 filed on Oct. 26, 2022, which is a US National Phase application of PCT application No. PCT/IB2021/053479 filed on Apr. 27, 2021, which claims the benefit of priority from U.S. Provisional Patent Application No. 63/016,423 filed on Apr. 28, 2020. The entire content of each of the above applications are hereby incorporated by reference.

BACKGROUND & SUMMARY

This application is directed to a top-entry valve design especially useful, for example, as an acid feed valve in a High Pressure Acid Leaching (HPAL) process which is one of successive hydro-metallurgical processes typically used to extract minerals such as Nickel and Cobalt from ore containing such metals. A slurry of water and mineral-containing ore particles is injected into an autoclave and mixed with approximately 98% concentrated sulfuric acid to leach desired minerals from the ore-containing slurry. The approximately 98% concentrated sulfuric acid is injected in the pressurized autoclave with special feed lines and acid feed valves which face highly severe conditions.

Sulfuric acid (even at 98% concentration) at ambient or low temperature as commonly used in some industrial applications may not require special valve designs or exotic materials. However in the HPAL process, an exothermic reaction occurs when 98% concentrated sulfuric acid chemically reacts with the water/mineral ore slurry leading to an instantaneous temperature increase. In addition, steam is used to maintain the autoclave at high temperature between two leaching operations—also leading to an exothermic reaction.

Generated heat from both sources is conducted into the acid feed lines and the acid feed valves in the HPAL process. At these temperatures, only a few materials can handle 98% concentrated sulfuric acid without rapid corrosion and/or failures leading to leakage.

Acid feed valves in the HPAL process are mainly used to isolate the autoclave from acid feed lines at times when no sulfuric acid injection to the autoclave is needed. However, during the autoclave leaching process, a back-flow of slurry, steam and/or gas can build-up on the downstream side of the acid feed valves. To avoid backflow as well as to avoid sulfuric acid in the acid feed line to contact other mediums which could potentially chemically react, the acid injection lines are (1) flushed and cleaned with high pressure nitrogen/air, then (2) filled with nitrogen/air at a pressure higher than the autoclave to ensure a permanent positive pressure. Therefore, acid feed valves need to open against high differential pressures and offer a bi-directional sealing performance in a mixed high pressure and corrosive slurry environment.

Due to such severe HPAL acid feed process conditions, the acid feed valves are frequently inspected and refurbished (e.g., up to 1-2 times a year). Due to risk associated with high temperature sulfuric acid, the feed lines and valves are usually enclosed, with minimum expected human operations, in a restricted area located close to the autoclave.

For such reasons, an improved acid feed valve should preferably have several key characteristics: (1) reduced risk in operation (e.g., no shell leakage, no stem sealing arrangement leakage, and a shell that is sufficiently resistant to the highly corrosive medium to be encountered in use); (2) heavy duty construction (e.g., internal valve components, especially valve stem, ball and seats, mechanically strong enough to operate against high differential pressures and the corrosive medium to be encountered in use, and reduced friction between internal components in the corrosive and erosive media to be encountered in use by deporting components in friction outside the valve body shell); and (3) ease of operation (e.g., easy handling, assembly and disassembly in the acid feed lines, and being in-line serviceable when needed).

Some prior art valve designs (e.g., for use as acid feed valves in the HPAL process) are depicted at FIGS. 1A, 1B, 2 and 3. Such prior art valves employ a three-piece valve shell design which involves initial valve construction by insertion of at least the stem (including its blow-out prevention enlarged section) laterally into a central body and then up through an opening for the valve stem. However this lateral, then upward, stem insertion limits the length of the stem (and thus the stem seal-packing length) and imposes additional potential leakage paths between the three-pieces when assembled. And this prior art arrangement and assembly process essentially requires a separate "floating" valve ball (or other operable valve structure such as a cylindrical and/or conical valve plug) element. A non-floating ball valve type is feasible but would imply (1) additional components in the waterway, (2) a weaker blow-out proof stem system and/or (3) a stem insertion in the body through an opening.

These prior art valves employ a central body coupled at each end, via a gasket structure (e.g., an O-ring, lip-seal, etc.), to a flanged end connector. This provides two potential leak paths between the central body and the gasket/flanged end connectors. Due to this three-piece geometry, a 98% sulfuric acid flow passes through each body gasket. Therefore, the O-rings or other gasket structures create permanent risks of leakage.

Such a three-piece valve shell assembly is either attached to the acid feed line using (1) a wafer-type end-flange connection (e.g., see FIGS. 1A and 3) or (2) an integral flange connection (e.g., see FIG. 2). This second connection implies that an insert retainer has two bolting patterns: one for clamping the insert to the body and one for attaching the insert retainer to the acid feed line. For a typical range of acid feed valve size and pressure class, the insert retainer is constrained in thickness and, consequently, the two bolting patterns drastically weakens its mechanical strength and increases the risk of leakage.

Rapid heating of the acid feed line and valves (e.g., due to the reaction of sulfuric acid with water in the autoclave) creates thermal stresses in all piping surrounding the autoclave including the acid feed line. These stresses are directly imposed on the three-piece body studs which create additional risk of leakage for a three-piece valve shell.

As briefly mentioned above, the prior art three-piece valve shell design limits the standard stem sealing arrangement. In particular, the three-piece valve shell geometry and its related valve assembly requires the valve stem to be inserted inside the central shell body (e.g., so that an enlarged blow-out structure towards the bottom of the valve stem is captured within the stem opening of the central body) drastically limits the volume available for a stem sealing arrangement. The sealing arrangement can only present a very limited height (e.g., see FIGS. 1A and 2). As a consequence, leakage through the stem sealing arrangement is a known issue in service.

An increase of stem sealing arrangement height is feasible but would imply (1) a larger three-piece body envelope and/or (2) the addition of a body extension. Both options would have a significant impact on the cost of the valve while the second option would add a potential leak path between the body and the body extension.

Still further, the prior art three-piece valve shell design limits the mechanical strength of internal valve components. The ball, seat and stem materials available for the HPAL application present limited mechanical properties—which is especially concerning in corrosive service with a potential slurry backflow. The combination of the three-piece body geometry and valve assembly that requires the stem to be inserted laterally and upwardly inside the central body part drastically limits the geometry and strength of internal structures, especially the ball and the stem. A two-piece ball and stem connection (i.e., a "floating" ball) is perhaps the only economically viable design option (e.g., see FIGS. 1A and 2) but such prior art design using separate ball and stem structures has experienced undesirable damage in service.

The depicted prior art valve designs also have presented undesirable amounts of thrust washer friction. The valve stem presents a collar (e.g., a section with a diameter larger than the stem packing section) to act as a mechanical protection against stem ejection when the valve is under internal pressure (i.e., to prevent catastrophic valve "blow out"). Such a feature is mandatory in ball valve design for severe service (e.g., in the HPAL process). In service, the stem collar enters into contact with mechanical bearings or the body itself (e.g., see FIG. 1A). This induces an extra friction during the valve operating stroke. In a corrosive environment with potential slurry backflow, the friction induced by such a device could drastically increase and impact valve operation. A prior art external thrust washer/stem collar configuration is depicted in FIG. 2.

The depicted prior art valve designs also present difficulties and risk during valve installation processes. In the case of a wafer-type valve connection with the acid feed line: (1) the connection studs are exposed to the corrosive surrounding environment creating a potential risk to mechanical integrity (e.g., see FIG. 3); (2) the wafer connection pattern is constrained by the valve envelope dimensions and requires an end-flange connection size larger than the standard one which forces the acid feed line to mix two different connection sizes (e.g., see FIG. 3); and (3) the installation of the sealing gasket between the acid feed line and the valve insert requires extra human operations and the gasket frequently gets damaged during this installation operation (e.g., see FIG. 3). Damaging the gasket induces a potential leakage risk. In addition, these prior art designs fail to provide external and visible indicators of valve shell or stem sealing arrangement acid leakage. The combination of the three-piece valve shell and the wafer stud arrangement does not allow for inspecting the valve internals when the valve is installed in the acid fee line.

Example embodiments are described below of an improved two-piece valve shell, top entry of the operating valve structure (e.g., a ball/stem structure), valve design (e.g., a single integral ball and stem structure can be inserted from the top downwardly into a single main valve body opening and retained therein by a single bonnet structure bolted to the top of the single main valve body). Such example embodiments offer solutions to the above-mentioned weaknesses of prior art three-piece valve shell/body designs.

Example embodiments of a two-piece valve body (each piece possibly being machined from a single block of a suitable hard metal like Alloy 20, a corrosion resistant austenitic stainless steel) are configured for severe HPAL process service (and/or similar severe industrial service applications) with a surface coating of tantalum or tantalum sleeves, or hard-coating, or the combination of any of the three on at least all internal wetted valve structure surfaces (i.e., the internal surfaces exposed to flowing fluid in use) to provide improved ability to handle hot (e.g., 500° F.) pressurized (e.g., 725 psi) 98% sulfuric acid fluid flows. Each of the two valve body pieces could also be assembled from different blocks welded together. However making each valve body piece from a single block has advantages of avoiding (a) welding operations and/or (2) connections with sealing features that could represent risks of leakage.

The tantalum surface coating may be applied by CVD (chemical vapor deposition) processes surface treatment or by other known surface coating processes if desired. The tantalum surface treatment may, for process simplification, include a coating on the entirety of a valve structure surface except for threaded studs/holes which are preferably masked off from surface coating during the CVD process. A tantalum coating of wetted valve surfaces more than 0.002 inch thick can be utilized in this example embodiment.

In some embodiments, a tantalum sleeve can be fixed to the metal (e.g., Alloy 20) body shell by welding and complex geometries interconnecting tantalum sleeves can be accomplished by welding between each sleeve (e.g., see FIGS. 13A and 13B). A tantalum sleeve, in comparison to a tantalum coating, may provide improved protection from corrosion.

An example embodiment of a two piece valve body needs only one, de-ported, gasket structure. For example, according to some embodiments, a top entry valve design can be composed of two main shell components, one body and one bonnet piece, each possibly machined from a solid block of metal or otherwise created (e.g., see FIG. 4B). This reduces the number of potential shell leak paths from two to only one. And this one potential shell leak path can be configured to employ two spaced-apart gaskets (e.g., of the O-ring type made from high temperature high density elastomer material such as FFKM (perfluoroelastomer)) installed between the body and the bonnet so as to create an inter-gasket chamber that can be suitably pressurized (e.g., with an inert gas such as nitrogen) at a pressure higher than any expected process pressures to positively prevent leakage there-through (e.g., see FIG. 6). Preferably the inner-most O-ring can be slightly damaged (e.g., by having a small orifice or by having a few partial small knife cuts) so as to purposefully pass some higher pressurized gas onward toward the inner valve structures and thus prevent relatively lower pressure process liquid from ever reaching the gasket material.

An example embodiment is described having only the main body component connected to an acid feed line and a gasket between the body and the bonnet is provided outside the flow conduit. This gasket location also reduces the risk of leakage in different ways, e.g.: (1) acid feed piping thermal stresses have a significantly lower impact on the body/bonnet gasket(s); (2) the body/bonnet gasket(s) face less severe thermal transients than a flow-through gasket (e.g., as in prior art depicted in FIGS. 1A and 2) to reduce thermal expansion of gasket-related components and thus minimizes required design clearances to ensure no body/bonnet leakage over the entire process temperature range; and (3) the process medium does not flow through the gasket(s) thus eliminating the gasket(s) (e.g., O-rings) as permanent risks for leakage paths.

When the machining of the valve body and/or the clamping the tantalum sleeve is getting complex in an example embodiment, an optional secondary bonnet facing the primary one can be employed (e.g., see FIG. 14 and FIG. 15). The secondary bonnet may provide access to the ball cavity and surrounding area from a direction different than the primary bonnet. Similar to the case of the primary bonnet, the joint between body and the secondary bonnet can be configured to employ two spaced-apart gaskets (e.g., of the O-ring type made from high temperature high density elastomer material FFKM) installed between the body and the secondary bonnet so as to create an inter-gasket chamber that can be suitably pressurized (e.g., with an inert gas such as nitrogen) at a pressure higher than any expected process pressures to positively prevent leakage there-through (e.g., see FIG. 6).

An example embodiment is described having a body/bonnet flange design allowing for use of live-loading washers to maintain constant body/bonnet gasket loading regardless of process conditions (e.g., see FIG. 5).

An example embodiment is described having a heavy-duty stem sealing arrangement with reduced risk of creating a leakage path. The top entry design geometry of this example embodiment does not constrain the height of the stem sealing arrangement (e.g., see FIG. 4B). Therefore it is possible to include additional sealing features such as a chamber between spaced-apart conventional graphite stem packing sets (e.g., see FIG. 6) that can be suitably pressurized (e.g., with an inert gas such as nitrogen) at a pressure higher than any expected process pressures to positively prevent process leakage there-through.

An example embodiment is described using heavy duty valve internals. The top entry design of this example embodiment provides more freedom in the design of internal valve structures, especially the ball and stem or other valve operating structures (e.g., a wedge/a conical/cylindrical plug and stem structure). For example, the top entry design: (1) does not require the stem to be inserted laterally then upwardly from inside the main body and thus the stem diameter is not constrained by the body internal diameter and can be designed larger than for a prior art three-piece valve shell/body design to provide higher mechanical strength; (2) allows using either a two-piece "floating" ball structure (e.g., see FIG. 7A) or one-piece ball/stem design structure which removes the ball/stem connection and associated possible damage in service while permitting the ball itself to provide the required valve blow out protection (e.g., see FIG. 7B); and (3) allows for having the ball and stem (ball either floating with a separate stem piece or non-floating with an integral stem) to be trunnion mounted using top and bottom trunnion bearings (e.g., see FIG. 8). Because a longer stem is possible with these examples, a top trunnion bearing can be located sufficiently away from severe process conditions to permit a thrust roller bearing in this position which thrust bearing can assist in keeping the stem and ball held downwardly disposed in a proper position within the valve internal structures.

An example embodiment includes a grooved ball valve seat carrier which cooperates with partially misaligned holes in the main body and a special fork-shaped tapered tines installation tool to facilitate insertion of the stem/ball/seats downwardly into an intended placement between ball valve seat retainers. The tapered tines of a double-tined installation tool are pushed downwardly through the misaligned body holes to engage seat carrier grooves on both sides of the valve body. As the tapered tines are pushed downwardly, the grooves of the seat carriers are wedged laterally outwardly (i.e., towards better groove alignment with the initially partially misaligned body holes) against a spring force so as to provide temporary clearance for downward assembly insertion of the ball and its seats between valve seat carriers. Once the ball/seats are in their intended assembled location between the seat carriers, installation tools are withdrawn allowing the seat carriers and their respectively associated seats to move laterally towards the ball into spring-loaded sealing engagement with the ball. In this example, an elastomer O-ring is disposed between each seat and its carrier, which carrier is spring-loaded toward the center of the main body (e.g., by a bevel spring acting against an internal lip of the main body structure). A metal-to-metal spring-loaded seal is thus established between the installed ball its valve seats. Without requiring removal of the valve from its process connections, service/inspection removal of an installed stem/ball/seats assembly from the top (i.e., when the top valve bonnet structure is removed) can be effected by similar but reversed use of the same tapered tines of two double-tined installation tools (one double tined tool to be used on each side of the ball).

An example embodiment includes a wedge obturator (cone or ball) and seats arrangement that slides into position in the body cavity with a motion from the top to the bottom (e.g., see FIG. 16).

An example embodiment is described having an external roller trunnion bearing at an upper portion of the stem to reduce valve stem operating friction. This example top entry design can displace a stem collar and thrust bearing from inside the main body to be located outside the main body (e.g., see FIG. 4B). This allows reduction of associated friction by (1) separating the bearing from the corrosive and potentially slurry medium; and (2) using bearing technologies with lower operating friction than if a bearing were to be located inside the valve shell. As previously noted, the prior art depicted in FIG. 2 appears to use a similar external thrust washer/stem configuration. However this example embodiment allows having both (1) internal thrust bearings that act as barriers to avoid medium circulating close to the stem sealing arrangement and (2) an external bearing technology with low operating friction.

An example embodiment with even greater design versatility can be supplied with or without an external roller bearing. In particular, a first configuration can have no roller bearing but includes an internal thrust washer. A second configuration can have a roller bearing and no internal thrust washer. A third configuration can have a roller bearing and an internal thrust washer.

An example embodiment is described where positive pressure sealing jackets provide a fully hermetic valve design. The two spaced gasket chambers described above can be filled with a pressurized medium at a pressure higher than the acid process pressure to prevent any leakage through the body/bonnet joint and the stem sealing arrangement (e.g., see FIG. 9). The same or similar pressurized chamber geometry could be added between the body and the secondary bonnet in embodiments in which a secondary bonnet is implemented (e.g., see FIG. 14). The body cavity created by the volume between the body, the ball and the two ball seats can also be filled with a medium at a pressure higher than the acid process (e.g., see FIG. 10). In this configuration the medium will hermetically seal the valve as well as act as a flush for any build-up of sulfuric acid in the body cavity during valve open/close and close/open strokes. The pressurized medium can be the same inert gas typically used for flushing and cleaning the acid injection lines or any fluid (gas or liquid) inert to sulfuric acid.

An example embodiment is described which provides a valve in-line serviceable without requiring dis-assembly of an acid feed line. In particular, the top entry design of this example allows performance of a complete assembly and dis-assembly of the valve internals when the valve is still installed in the acid feed line (e.g., see FIG. 11).

An example embodiment is described which permits the usage of highly visible acid leakage indicators. In particular, the top entry design of this example allows conventional leakage detectors to be installed for high visibility on the valve shell. Any sulfuric acid leakages will instantaneously activate the detectors and visually inform the operator of an issue.

As will be appreciated some example configurations of example embodiments include: (1) a floating two-piece ball/stem with stem and body/bonnet lantern rings of spaced apart seals and straight body flow bore; (2) a floating two-piece ball/stem with stem and body/bonnet lantern rings of spaced apart seals and wedge obturator/seats geometry; (3) a one piece ball/stem with stem and body/bonnet lantern rings of spaced apart seals with straight body flow bore; (4) a one piece ball/stem with stem and body/bonnet lantern rings of spaced apart seals with wedge obturator/seats geometry; (5) a trunnion mounted one piece ball/stem with stem and body/bonnet lantern rings of spaced apart seals; (6) a trunnion mounted two piece ball/stem with stem and body/bonnet lantern rings of spaced apart seals; (7) a trunnion mounted one piece ball/stem with stem and body/bonnet lantern rings of spaced apart seals and with wedge obturator/seats geometry; and (8) the internal body/ball cavity as well as sealing chambers (located between spaced apart body/bonnet and stem/bonnet seals, and optionally between the body/secondary bonnet) pressurized with nitrogen to hermetically encapsulate the valve internals from a corrosive flowing process materials.

BRIEF DESCRIPTION OF THE DRAWINGS

FIG. 4A is a perspective view of an assembled example embodiment while

DETAILED DESCRIPTION OF EXAMPLE NON-LIMITING EMBODIMENTS

Figure 1A:
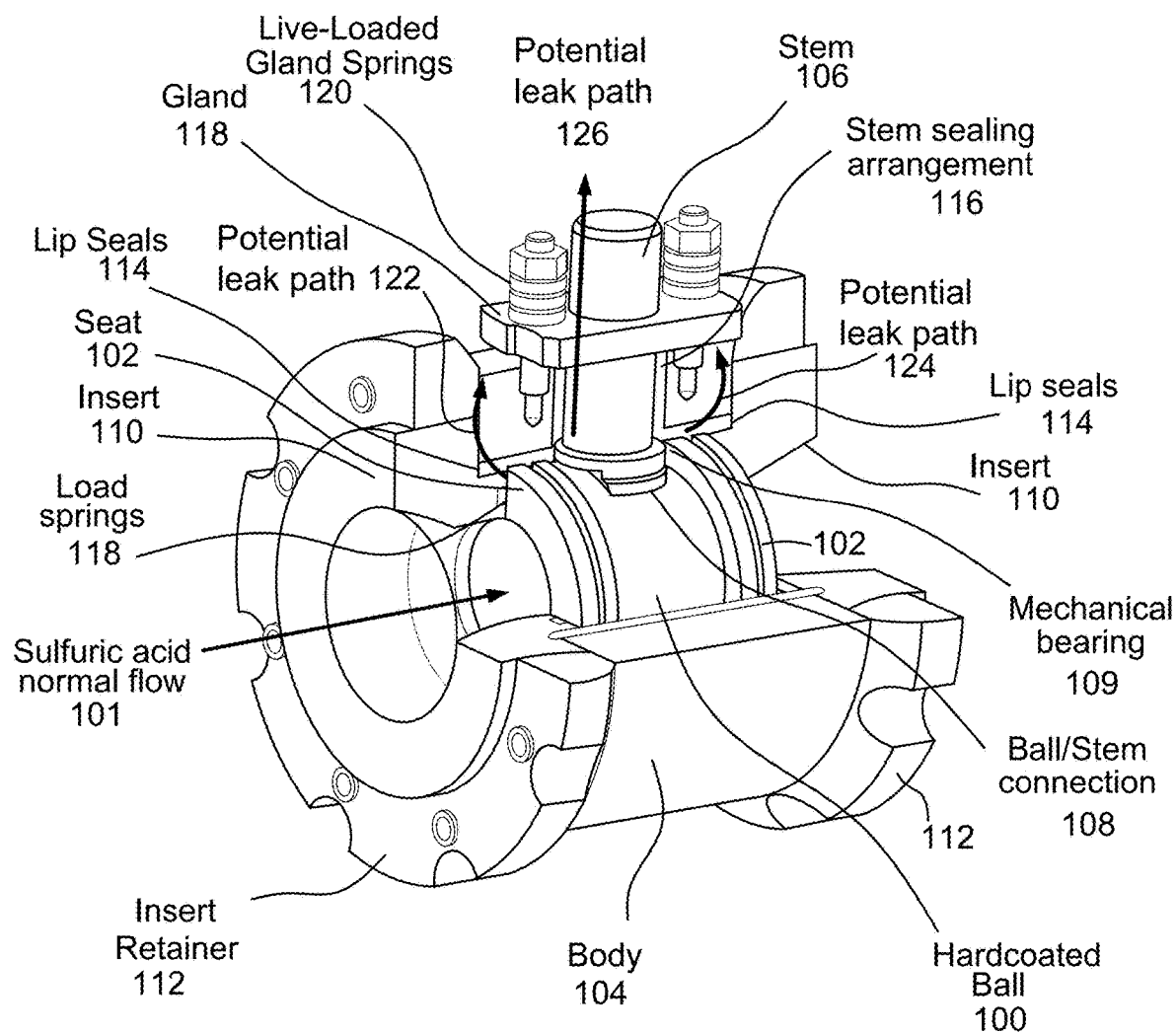
FIG. 1A is an isometric partially sectioned depiction of a prior art three-piece valve shell structure with an exploded schematic view depicted in FIG. 1B.

The prior art ball valve depicted in FIG. 1A includes a hard-coated ball 100 (having a flow path 101 there-through) disposed between valve seats 102 within a central body 104. Ball 100 is rotatable to open/close the valve flow path 101 by turning stem 106 which is connected to the ball via a ball/stem connection 108 which includes a mechanical thrust bearing 109. The shell structure of the valve assembly includes inserts 110 and insert retainers 112 bolted onto each end of the central body 104 to retain the ball seats 102 and associated lip seals 114. A stem sealing arrangement 116 and associated gland and live-loaded gland springs 120 provide some sealing around the rotatable stem 106 and its connection to ball 100 within the valve cavity formed by the valve shell. Load springs 118 (on each side) keep valve seats 102 pressed into sealing contact with ball 100.

As depicted by darkened leak flow path lines 122, 124 and 126 in FIG. 1A, this multi-part shell structure leaves three potential leak paths from the valve flow path (through which may flow hot pressurized highly concentrated sulfuric acid in some severe industrial service applications) to the external ambient environment (i.e., leak paths 122 and 124 emanating from insert/retainer connections at each end of body 104 and leak path 126 emanating from the stem connection passing through an aperture in body 104 (or between stem 106 and stem sealing arrangement 116). Although each of these potential leak paths is provided with sealing structures attempting to prevent or limit actual leakage, such seals may not be 100% effective and/or may deteriorate over time to permit some leakage.

Figure 1B:
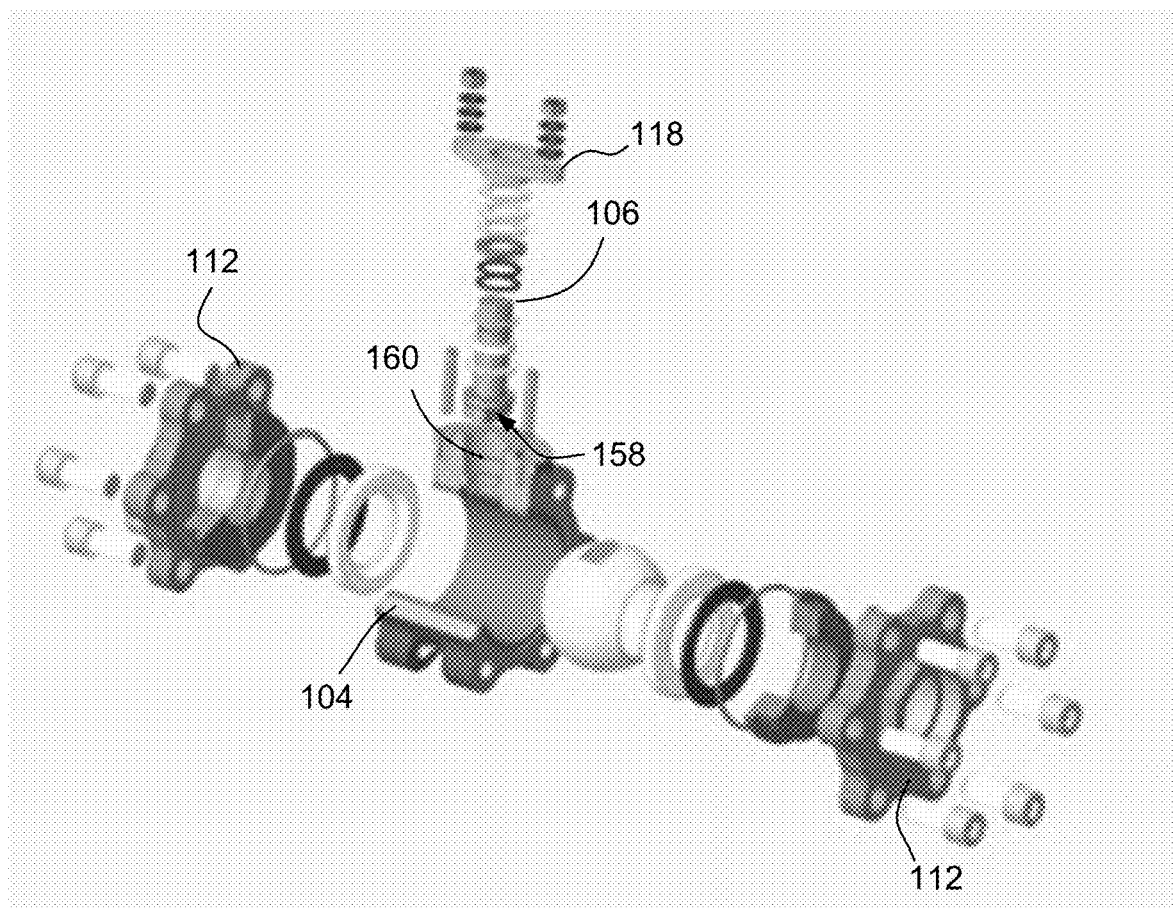

A schematic depiction of such prior art ball valves is provided in FIG. 1B. Here, as those in the art will appreciate, the valve shell structure essentially comprises three-pieces—a central body 104 and two flanged bolted-on ends 112. A valve stem 106 with its required blow-out prevention enlargement 158 must be inserted laterally into the body 104 and then upwardly through aperture 160 before ends 112 are bolted onto body 104. This prior art type of three-piece shell assembly results in the three potential leakage paths discussed above.

Figure 2:
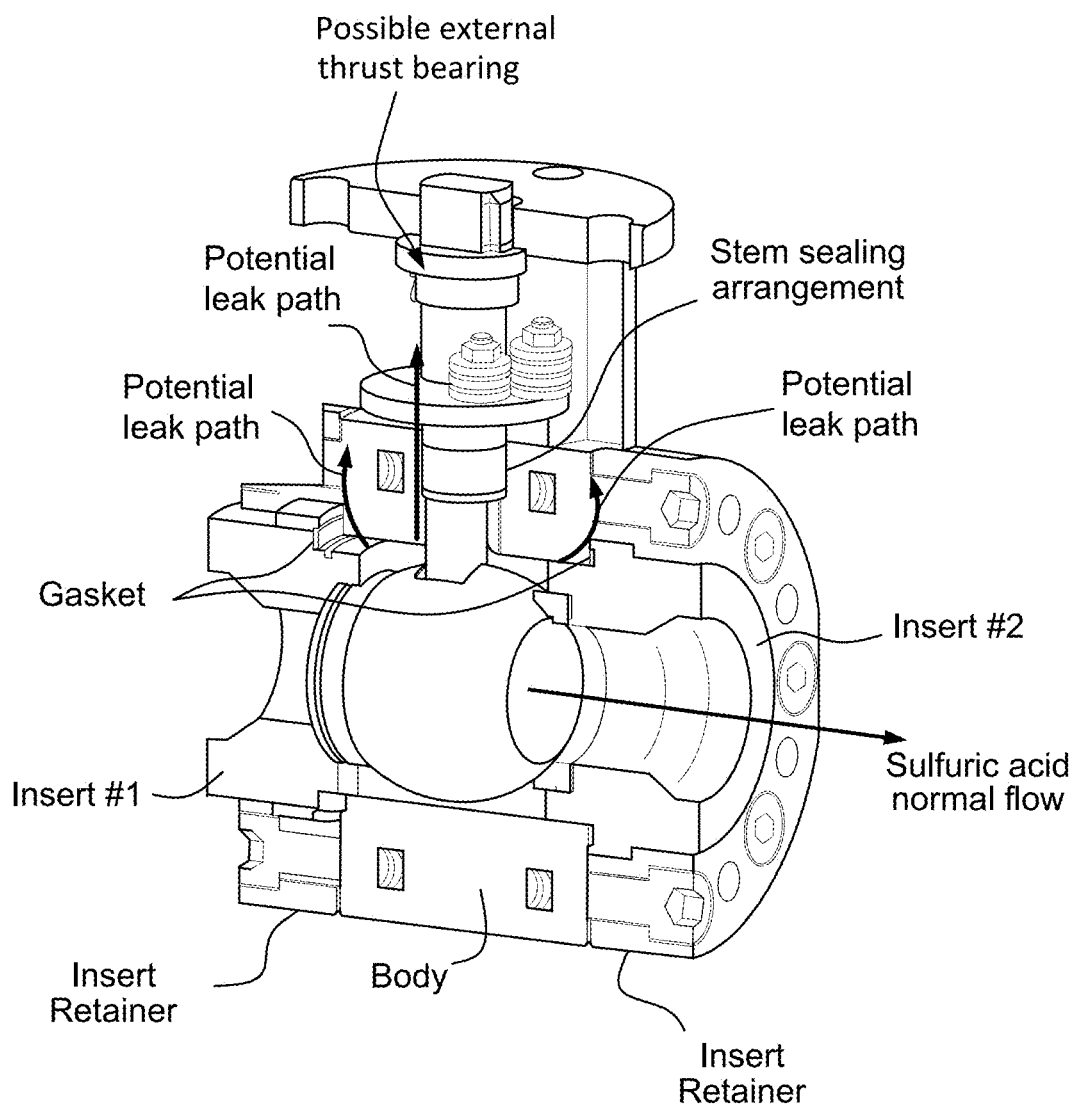
FIG. 2 is an isometric partially sectioned depiction of another prior art three-piece valve shell structure.
Figure 3:
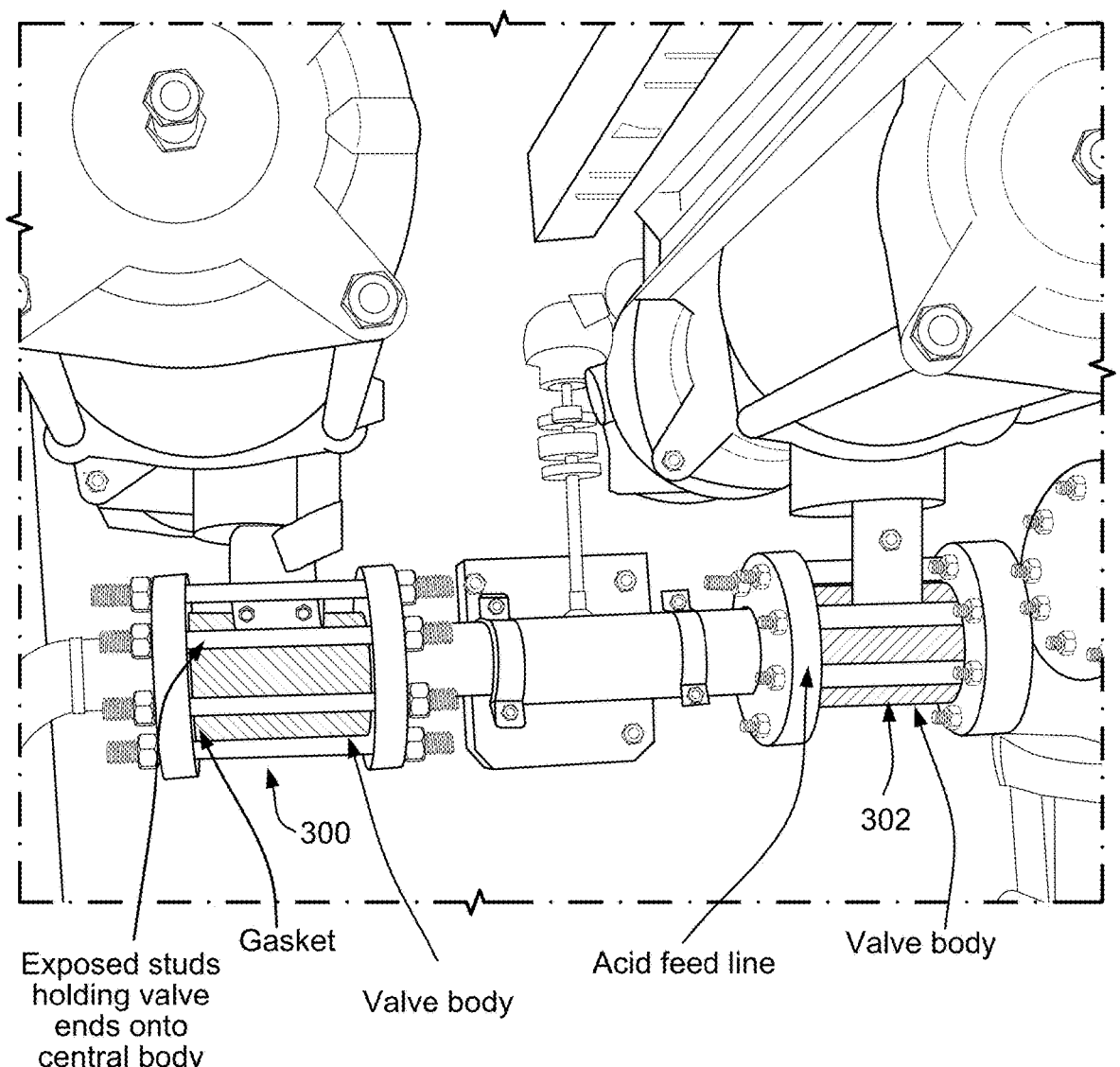
FIG. 3 depicts yet another prior art three-piece valve shell structure installed on an acid feed line in an HPAL process environment.

FIGS. 2 and 3 respectively depict two other prior art 3-piece ball valve structures which are similar in structure to that explained above with respect to FIGS. 1A, 1B. FIG. 2 includes labels similar to those in FIG. 1A to make it substantially self-explanatory. FIG. 2 may depict an external low friction bearing similar to one feature of some example embodiments described below. FIG. 3 depicts two prior art ball valves 300 and 302 in a serial connection as used in a typical acid feed line and having exposed studs holding valve ends onto a central body.

Figure 4A:
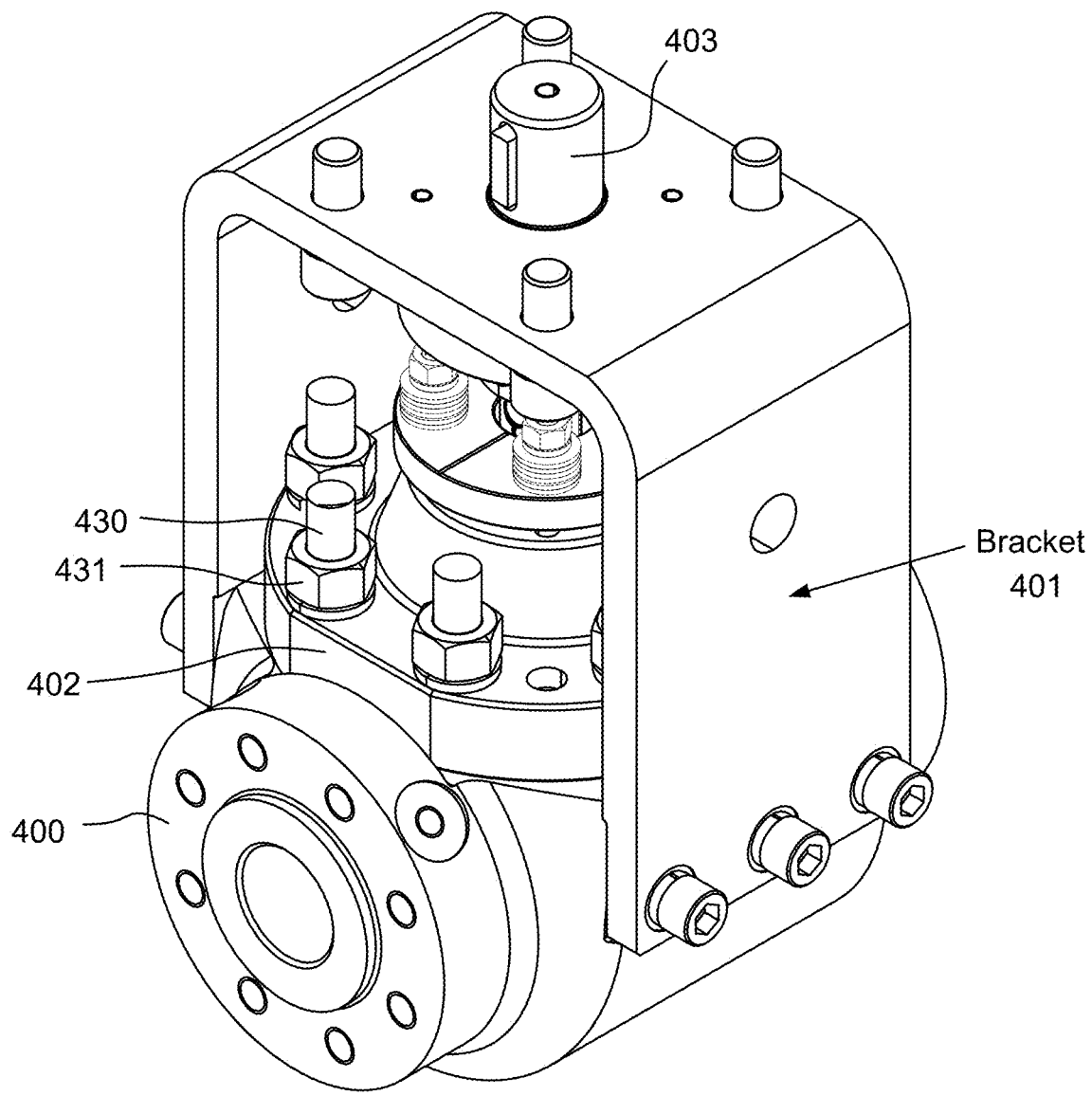

As depicted in FIG. 4A, an example embodiment provides a ball valve shell structure comprising essentially only two parts: (1) body 400 and bonnet 402, the body and bonnet are bolted together via studs 430 and nuts 431. A massive bracket 401 bolted to the sides of body 400 or on the bonnet 402. The bracket has a top aperture through which a valve operating coupling shaft 403 extends.

Figure 4B:
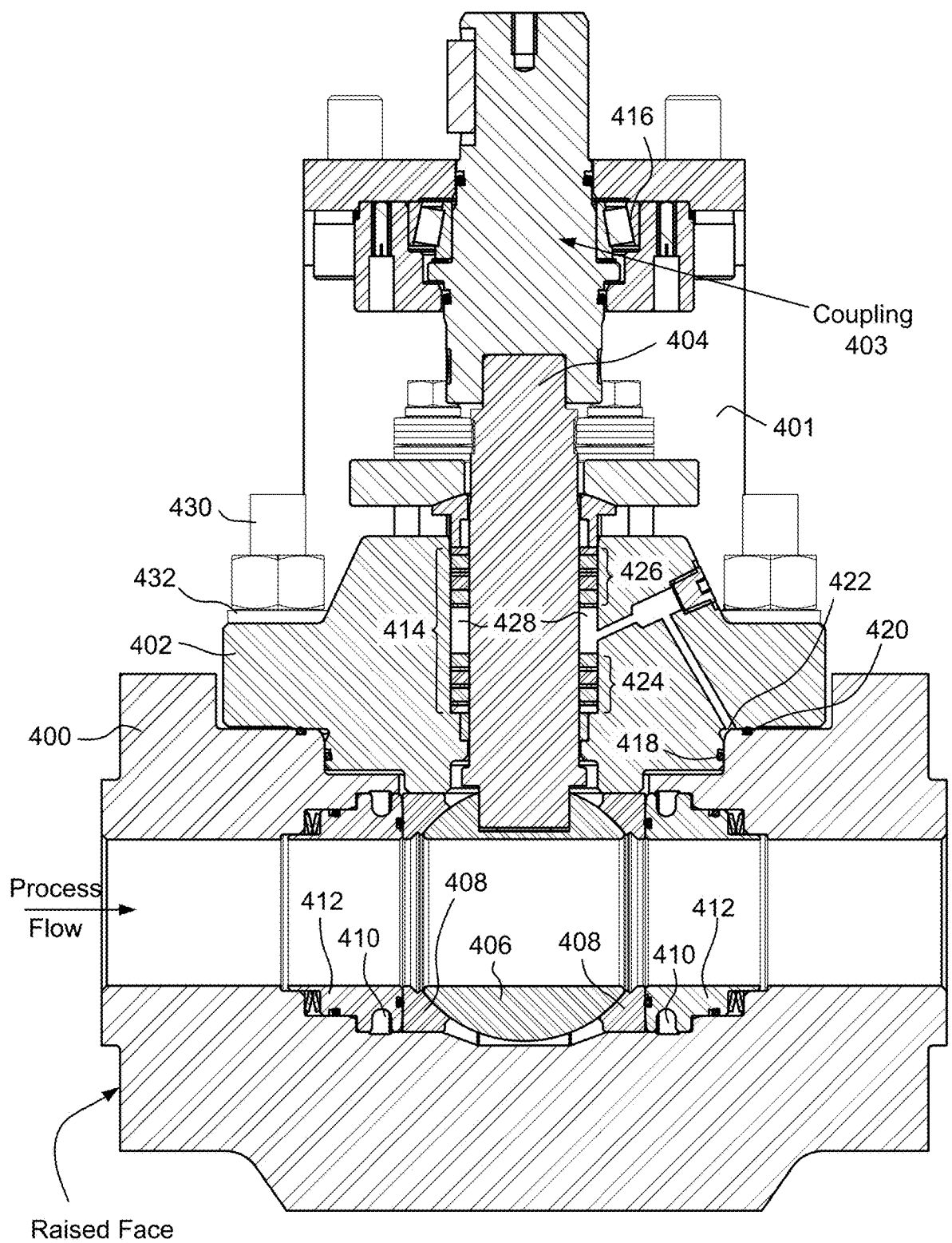
FIG. 4B is a schematic cross-sectional view of the FIG. 4A example two-piece valve shell body and bonnet structure suitable for use as an acid feed valve in an HPAL process.

FIG. 4B provides a cross-sectional view of the FIG. 4A example embodiment. Body 400 is preferably machined from a single block of metal. Bonnet 402 is also preferably machined from a single block of metal. This two-piece valve shell structure reduces potential leakage paths to only two: (1) a path passing between body 400 and bonnet 402 and (2) a path passing between bonnet 402 and stem 404. This example configuration permits fixing (permanently or temporarily) a torque monitoring transducer on the stem 404 or coupling 403 or bracket 401 for monitoring an applied valve operating torque. An acoustic transducer can also be mounted on the body near seat 408 (or bonnet 402) to detect acoustic signals caused by liquid leakage past the valve seats 408. One or more pressure sensor transducers can also be connected to monitor the pressures within internal inert gas chambers such as chamber 428 (including possible pressure differentials between such internal chambers). And electrical outputs from one or more of such transducers and be connected to a data acquisition system with local access or remote access to such measured data.

In addition, since during valve assembly processes, ball 406 is inserted from the top (before bonnet 402 is bolted down to body 400), the size of the ball and/or body 400 (with respect to the envelope dimensions of the valve and the external constraints imposed for the valve) does not impose undue limits on the length and/or diameter of stem 404. This permits the valve stem 404 to extend upwardly through a stem sealing arrangement 414 within bonnet 402 including multiple packed gland stem sealing assemblies 424, 426 and, possibly via an intermediate driver or coupling component as depicted in FIG. 4B, to be coupled upwardly to an external thrust bearing 416 (which not only reduces rotational friction but also provides a downwardly directed force to assist in keeping the valve stem properly located in the valve assembly). As will be appreciated, the top-entry design also permits the stem itself to extend directly to the external thrust bearing (i.e., without an intermediate driver or coupling component).

Figures 7A, 7B:
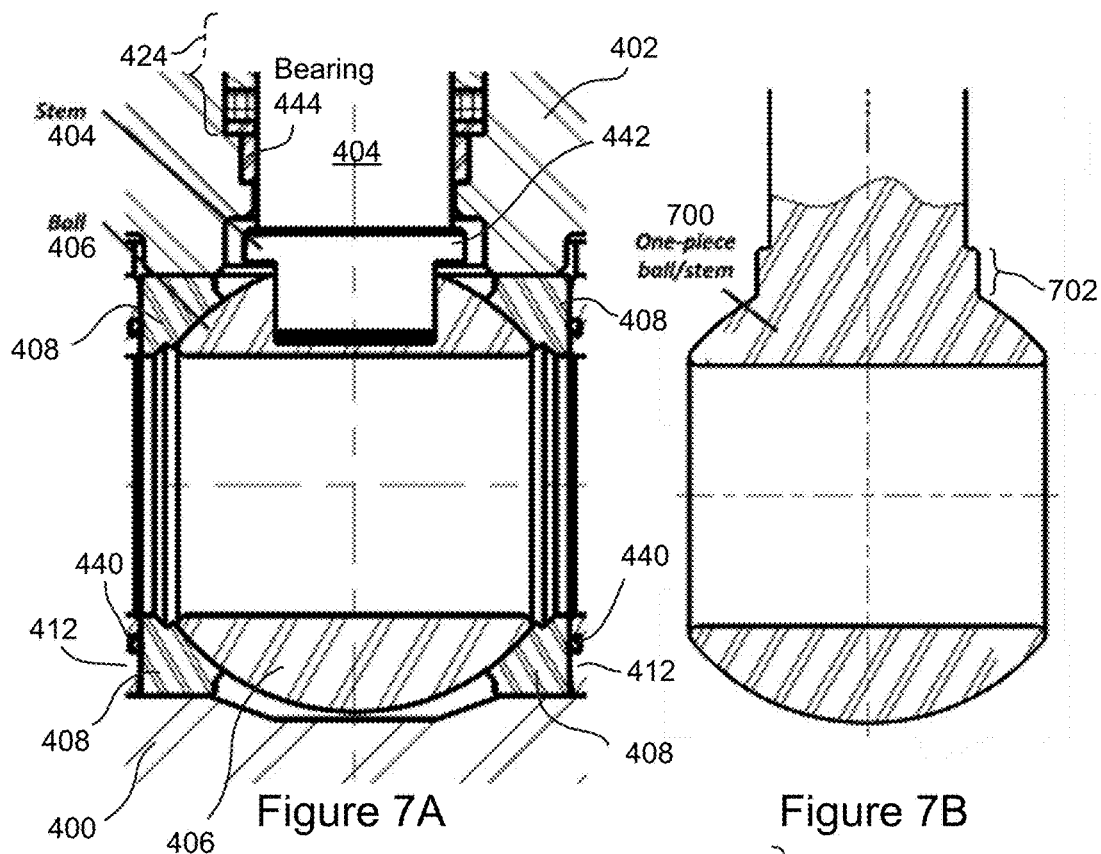
FIG. 7A is an enlarged cross-sectional view of the ball and stem connection for a two-piece floating ball/stem arrangement as shown in FIG. 4.
FIG. 7B is an enlarged cross-sectional view of a one-piece ball and stem structure that can be used in the body/bonnet structure of FIG. 4 instead of the two-piece ball/stem structure of FIG. 7A.

Stem 404 can be a separate structure coupled to a "floating" ball 406 as shown in FIG. 4B. Alternatively stem 404 and ball 406 can be made as a single integral part (e.g., as shown in FIG. 7B by machining the combined stem/ball structure from a single block of metal) for added strength and reduction in number of parts to be assembled.

A spaced-apart pair of O-rings 418, 420 (on either side of a chamber 422 pressurized with inert gas) seal the body/bonnet potential leakage path. The seals 418, 420 are preferably of the O-ring type made from high temperature high density elastomer material such as FFKM. The stem/bonnet potential leakage path is sealed with a spaced-apart pair of packed gland gasket sealing structures 424, 426 leaving a chamber 428 there-between which is also pressurized with inert nitrogen gas. It is noted that the spaced-apart pair of packed gland gasket sealing structures 424, 426 and chamber 428 there-between is formed all around the stem, yielding a shape that may be referred to as lantern rings. The pressurized inert nitrogen gas is preferably held at a pressure sufficiently higher than the process flow (e.g., 30-50 psi higher than the pressure of a process flow of hot pressurized sulfuric acid) so as to positively prevent leakage of the process flow to the outside ambient environment.

This top entry valve structure where ball 406 and its seats 408 are inserted downwardly between seat retainers 412 is facilitated by a properly dimensioned and located groove 410 in seat retainers 412 cooperating with a forked installation tool and partially misaligned installation holes inside body 400 (to temporarily move the seat retainers 412 outwardly towards the valve ends while the ball and its seats are inserted).

Figure 4C:
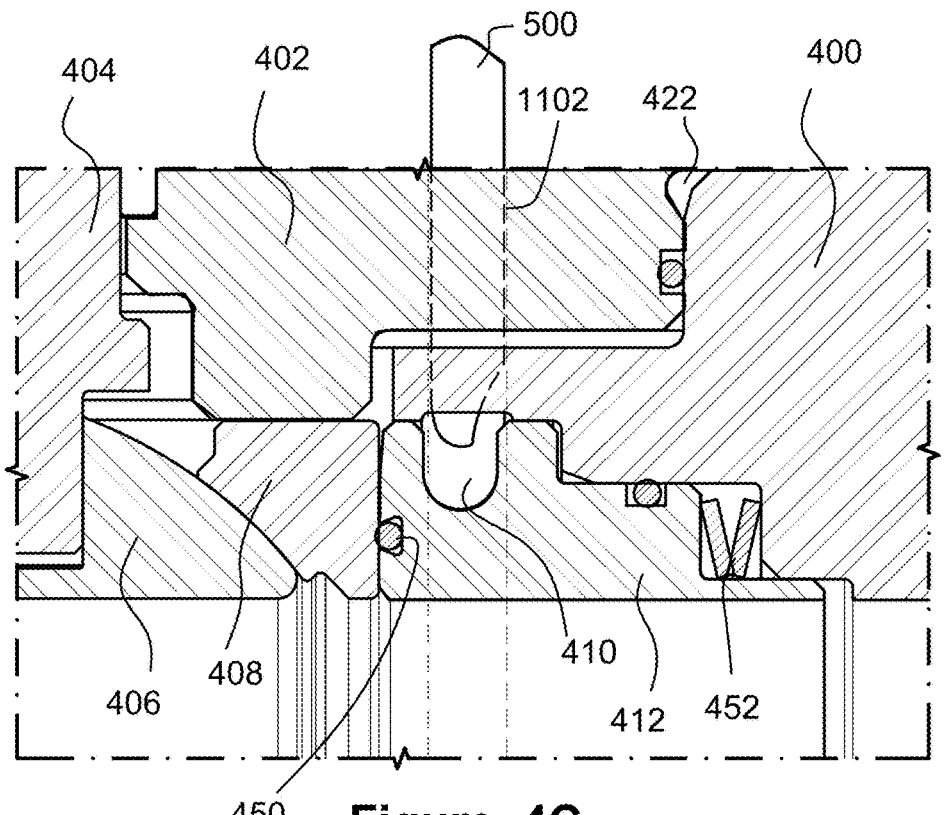
FIGS. 4C and 4D are enlarged cross-sectional views showing successive positions of an insertion tool used to temporarily engage and move grooved valve seat retainers outwardly to provide clearance for the ball and its valve seats to be entered downwardly through the top of the valve body or removed upwardly through the top of the valve body.
Figure 4D:
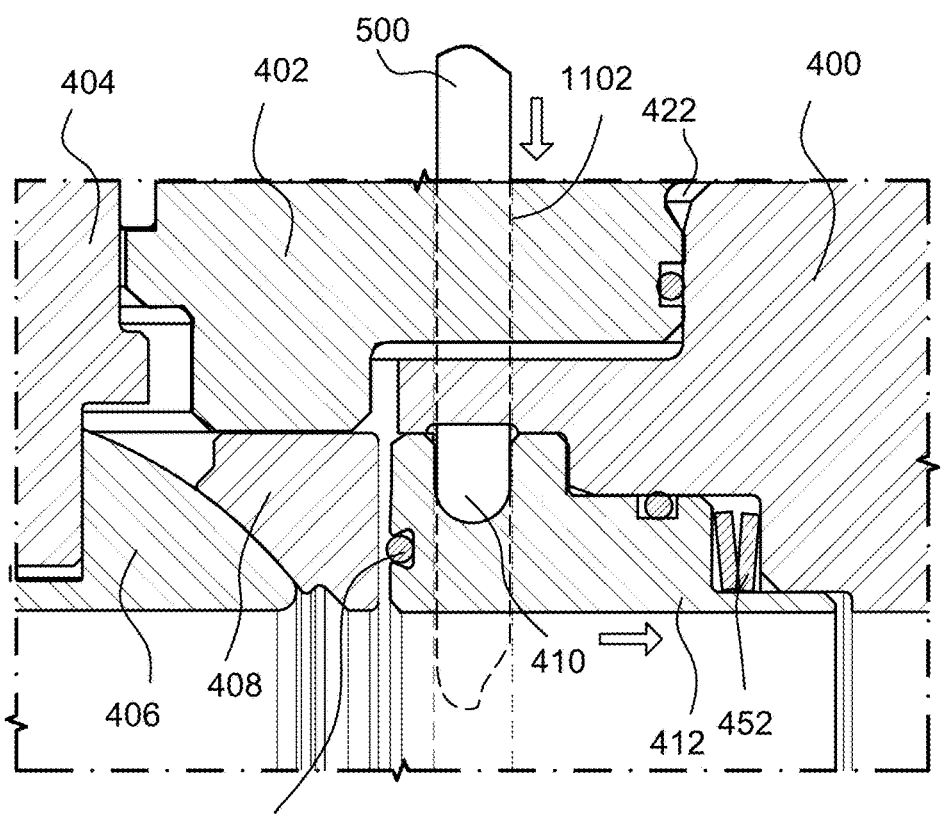
Figure 12A:
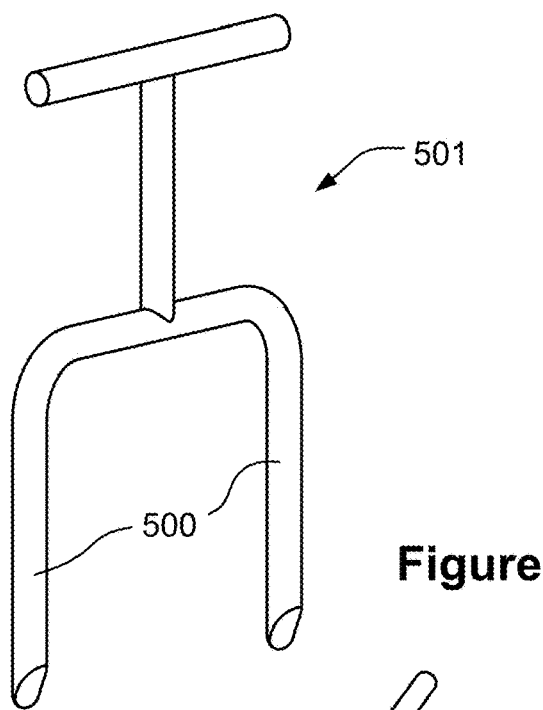
FIG. 12A provides a schematic isometric view of an example forked tool for use in temporarily moving internal valve structures outwardly to provide clearance for insertion or removal of centrally located internal valve structures through the top of the valve body.
Figure 12B:
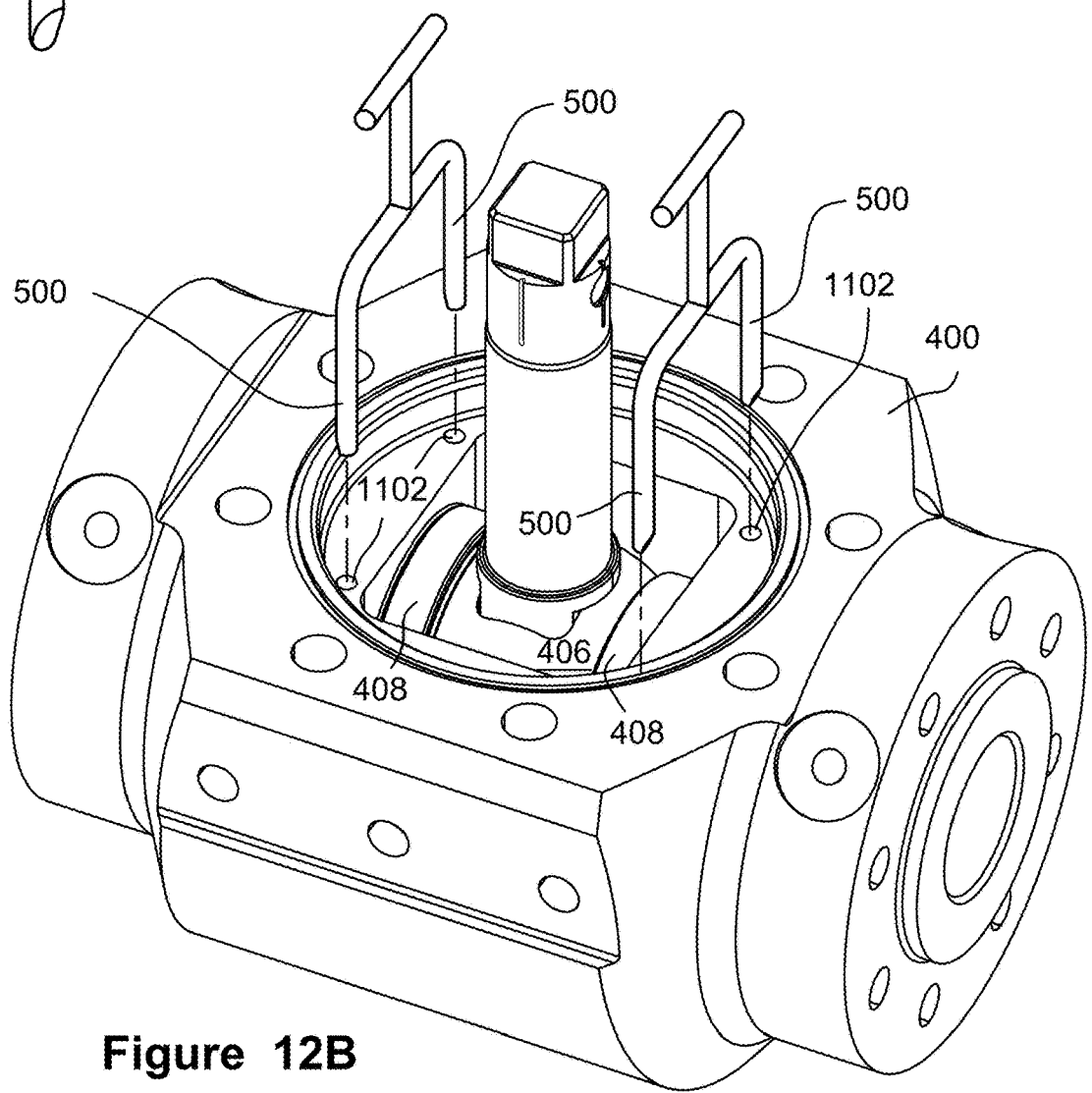
FIG. 12B is an isometric view demonstrating how two of the FIG. 12A forked tools can be used to temporarily facilitate insertion or removal of centrally located internal valve structures though the top of the valve body.

As shown in the enlarged cross-sectional depictions of FIGS. 4C and 4D, tines 500 of a forked tool (see FIG. 12A) are inserted downwardly into grooves 410 of the valve seat retainers 412 at opposing circumferential locations through slightly misaligned holes 1102 in the body 400 (see FIG. 12B). FIG. 4C depicts a point in time when the tines 500 have been inserted into holes 1102 but not yet engaged with grooves 410. As will be noticed, the seal retainers 412 are still in metal-to-metal sealing engagement with valve seats 408 (the interspersed elastomer O-ring merely providing some minor internal spring force). However FIG. 4D depicts a point in time when the tines 500 have been inserted further downwardly through holes 1102 to engage with opposing circumferential portions of grooves 410 and wedge the seat retainers 412 outwardly (against an inwardly directed spring force exerted on the seat retainers 412 by SS bevel springs 452). As will be noticed, now the seal retainers 412 have been moved outwardly so as to break their sealing engagement with the valve seats 408 and provide sufficient clearance to permit the ball and seats to be inserted or removed through the top of body 400 (if the bonnet 402 has not yet been installed or has been removed for in-line servicing of the valve).

Figure 17:
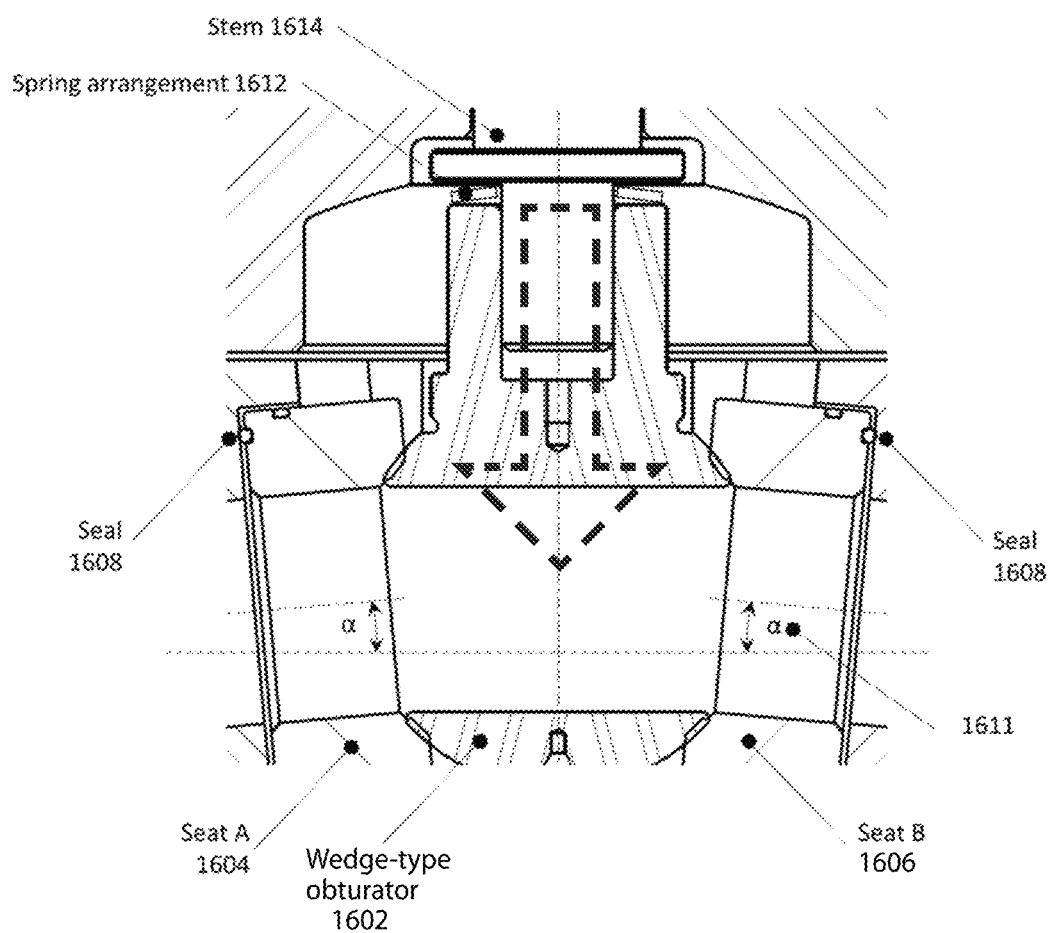
FIG. 17 illustrates an example embodiment that includes a wedge obturator and seats arrangement that slides into position in the body cavity with a motion from the top to the bottom according to some example embodiments. The figure illustrates an enlarged cross-sectional view of an example embodiment having a floating ball/stem arrangement, a wedge obturator/seat arrangement and a spring loading arrangement along the stem longitudinal axis (it is noted that FIG. 8 above illustrates an enlarged cross-sectional view of an example embodiment having a trunnion mounted ball using trunnion-mounted bearings located above and below the ball).

Some example embodiments (e.g., FIG. 17) include a wedge obturator and seats arrangement that slides into position in the body cavity with a motion from the top to the bottom (e.g., as illustrated by the dashed arrow in FIG. 17).

Figure 4E:
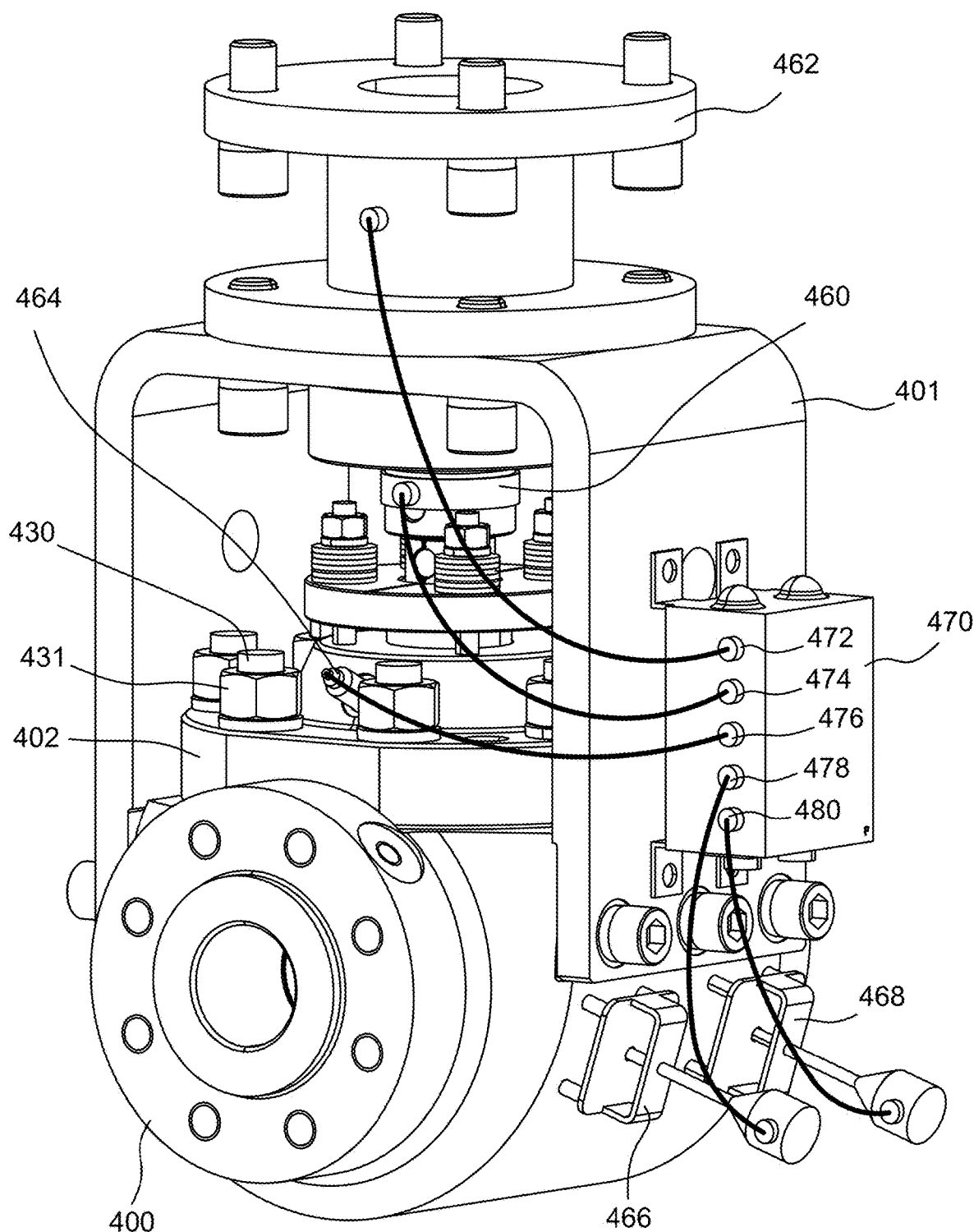
FIG. 4E is a schematic perspective view of the FIG. 4A and FIG. 4B example depicting installed torque sensors, seat leakage acoustic sensors and a pressure sensor connected to an instrumentation box which locally processes collected sensor data and/or sends it (wirelessly or by wire) to a remote server.

FIG. 4E depicts the example of FIGS. 4A/4B with various valve parameter sensors (and an associated instrumentation box) installed either permanently or temporarily. In the depicted example, a conventional torque sensor 460 is installed directly on stem 404 or coupling 403 to measure valve operating torque as the valve is operated (e.g., to on or off rotary positions). Alternatively (or in addition), an enclosed torque sensor 462 (also of conventional design) can be installed on top of bracket 401 encompassing the driven coupling shaft 403 to measure valve operating torque. A conventional pressure sensor 464 is threaded into a port on bonnet 402 internally connected with chamber 422 and/or chamber 428 so as to measure the inert gas pressure applied to help prevent process flow from leaking outwardly. Conventional acoustic valve seat leakage sensors 466 and 468 are installed on the external surface of valve body 400 spaced apart and located so as to acoustically sense leakage bypassing valve seats on either side of the valve ball 406. An instrumentation box 470 is installed on a side of bracket 401. Each sensor 460, 462, 464, 466 and 468 has an electrical output coupled to internal circuits of instrumentation box 470 via connection ports 472, 474, 476, 478 and 480. As those in the art will appreciate, wireless connections instead of the depicted wired connections can be made to couple sensor outputs to instrumentation box circuits. As those in the art will appreciate, conventional circuits within the instrumentation box can locally process collected sensor data and/or send the collected data to a remote server.

In some embodiments, the instrumentation box 470 can also be used to collect electrical output signals from sensors upstream the acid feed valve such as the pressure or the temperature in the acid feed line of FIG. 3. The instrumentation box can also interlink and sequence the opening/closing of the actuators of the different valves used for the acid feed line and nitrogen/air line protective positive pressure inlet and outlet valves.

Figure 5:
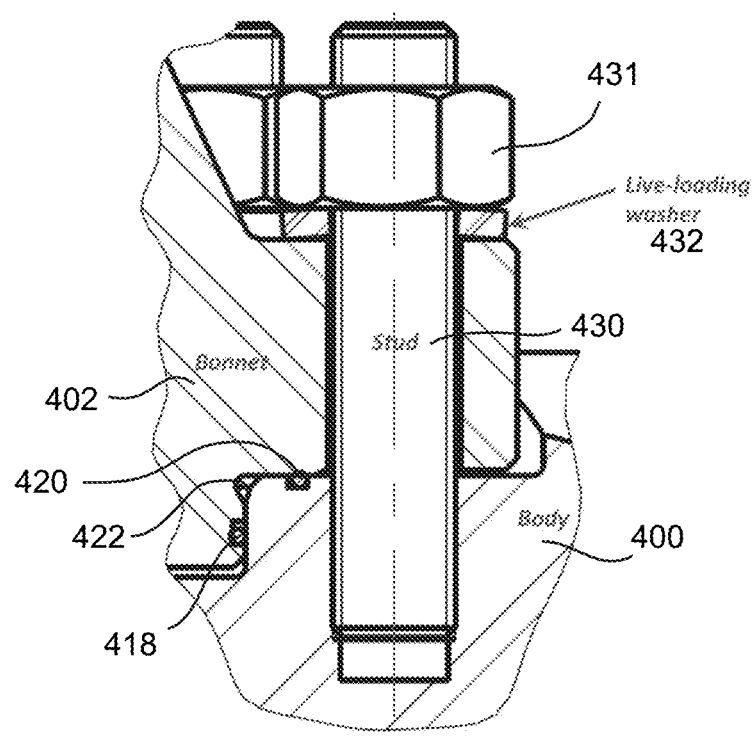
FIG. 5 is an enlarged cross-sectional view of the live-loading of a stud connection between the body and bonnet of FIG. 4B.

FIG. 5 provides an expanded cross-sectional view of the bonnet 402 securely bolted to body 400 via threaded studs 430 and the usual threaded tightening nut 431 against a live loading washer 432 (so as to provide a more constant connection force when expected severe temperature and pressure changes are experienced by the valve structure). FIG. 5 also provides an enlarged view of spaced apart O-ring seals 418 and 420 sandwiched between orthogonal faces of the bonnet/body interface with an intervening over-pressurized inert gas chamber 422. Preferably an outer portion of the inner-most O-ring 418 is slightly damaged (e.g., by a few partial (e.g., half-through) slice cuts with a utility knife or the like distributed evenly around the circumference of the O-ring) so as to permit a small amount of over-pressurized inert gas (e.g., nitrogen) from chamber 422 to pass onward around the entire circumference of the bonnet-body interface toward inner valve structures thus positively preventing process flow leakage via the bonnet-body interface. This high pressure pocket of nitrogen gas helps prevent process flows such as a corrosive liquid acid from touching a sealing element. Preferably the high pressure nitrogen gas is 30-50 psi higher than the pressure of the valved process flow (e.g., 720 psi).

Figure 6:
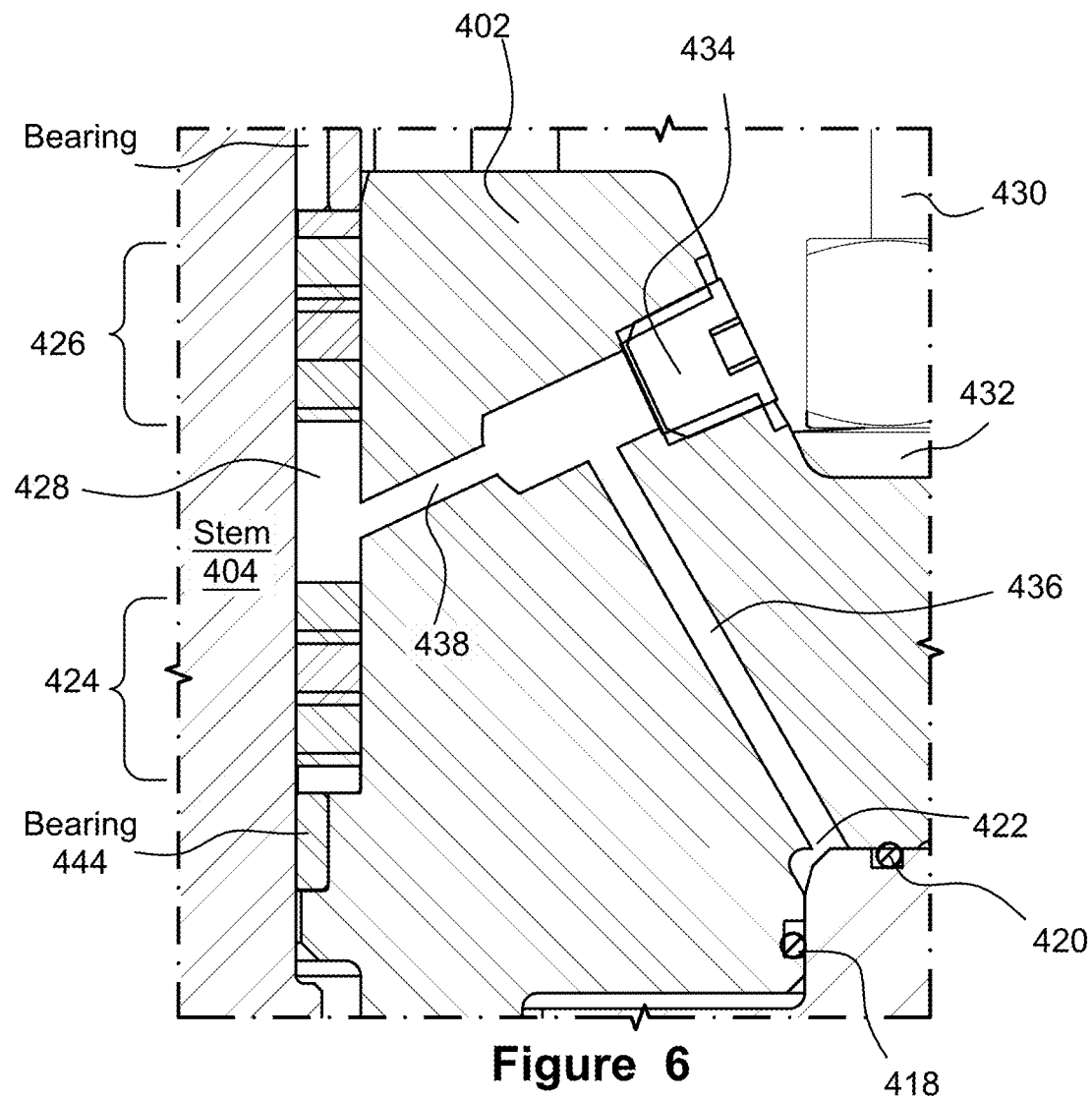
FIG. 6 is an enlarged cross-sectional view of the sealing arrangements between the bonnet and stem and between the bonnet and body of FIG. 4B.

FIG. 6 provides an expanded cross-sectional view of the sealing structures between the bonnet-body and bonnet-stem interfaces. Body 400 and bonnet 402 are sealed at two orthogonally situated interfaces by O-rings 418 and 420 with an interspersed sealing chamber 422 that is over-pressurized (with respect to the pressurized process flow through the valve) with an inert gas (e.g. nitrogen) via a pressurized gas input port 434 and passage 436 internal to bonnet 402. Bonnet 402 and stem 404 are sealed at two spaced apart packed gland gasket structures 424 and 426 spaced along the vertical circumference of stem 404 leaving an interspersed sealing chamber 428 that is also over-pressurized (with respect to the pressurized process flow through the valve) with an inert gas (e.g., nitrogen) via pressurized gas input port 434 and passage 438 internal to bonnet 402. The packing gasket structures 424 and 426 can be conventional graphite-based packing gasket structures as will be appreciated by those in the art.

FIG. 7A provides an expanded cross-sectional view of the floating ball 406 and stem 404 located within body 400 and bonnet 402. In particular, FIG. 7A provides an expanded view of the circular ring-like sealing ball valve seats 408 (one on each side of ball 406 as previously explained) providing a complete circumferential metal-to-metal seal with the surface of ball 406 which can be rotated (to turn the process flow on or off) via rotation of stem 404. Seats 408 are pressed into sealing contact with ball 406 by seat retainers 412 (which are spring loaded towards ball 406). An O-ring 440 is preferably interspersed between each seat 408 and its retainer 412 to provide some elastic cushion/spring force between these two structures as well as to create a sealing bearing behind the seat 408. As shown in FIG. 7A, stem 404 includes an expanded blow-out prevention structure 442 at its distal end captured by bonnet 402. A bearing 444 is also preferably included near the distal end of stem 404 to reduce frictional torque resisting rotation of the valve operating stem 404.

While FIG. 7A depicts a "floating" ball (i.e., separate ball and stem structures), FIG. 7B depicts a "non-floating" one-piece ball/stem structure 700 machined from a single piece of metal. It includes an enlarged pressure blow-out prevention section 702 for capture within the bonnet 402 if this integral stem/ball structure 700 is utilized instead of the separate stem 404 and ball 406 structures depicted in earlier figures of an example embodiment. However, as those in the art will appreciate, this one-piece ball/stem structure will already capture the ball within the bonnet and thus a separate blow-out prevention enlargement of the stem base may not be required.

Figure 8:
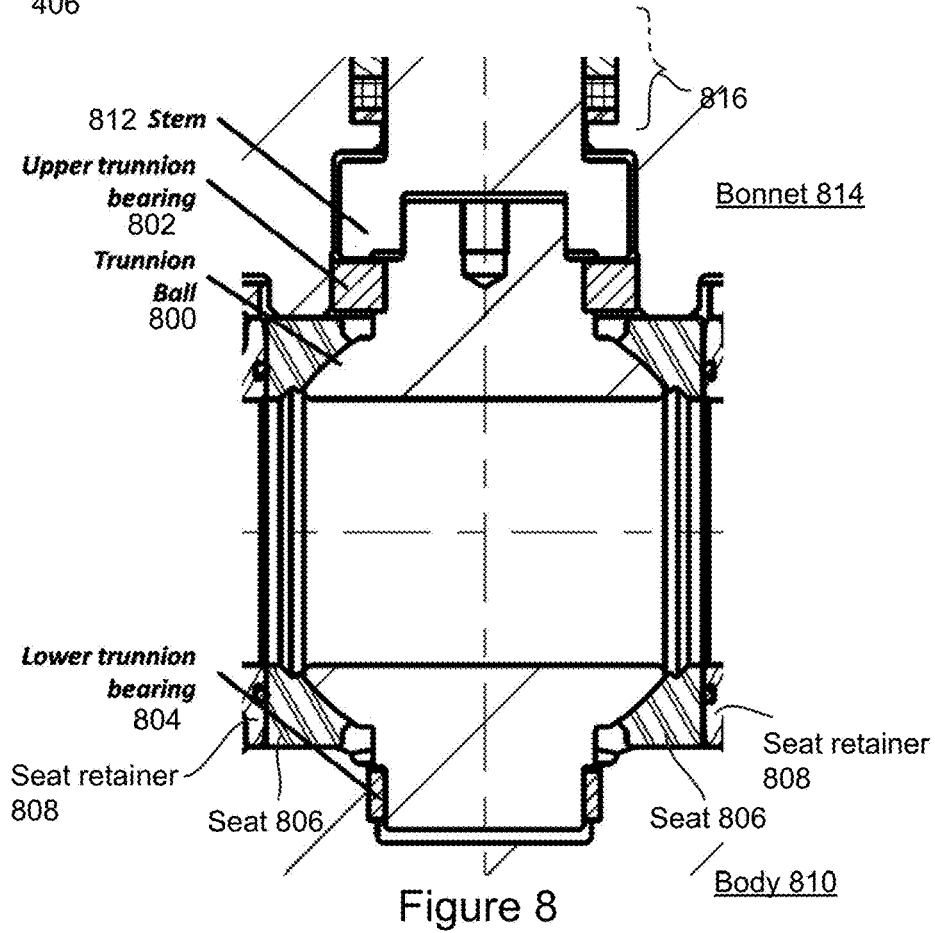
FIG. 8 is an enlarged cross-sectional view of an example embodiment having a trunnion mounted ball using trunnion-mounted bearings located above and below the ball.

FIG. 8 depicts another example floating ball embodiment where the ball 800 is machined to accept an upper trunnion bearing 802 and a lower trunnion bearing 804 thus further reducing rotational operating friction while also helping maintain the correct position of ball 800. This embodiment also includes seats 806 and seat retainers 808 within body 810 and stem 812 within bonnet 814, packed gland gasket seals 816 and the like similar to other example embodiments.

Figure 16:
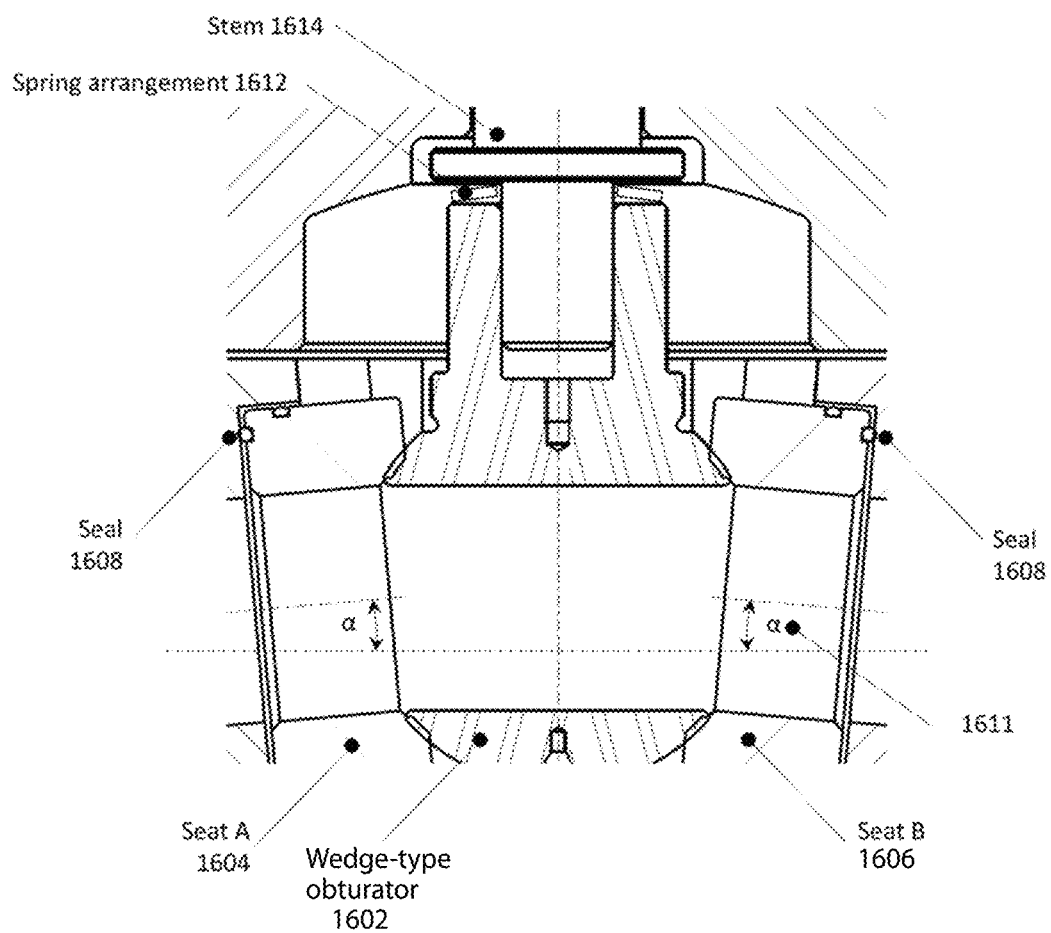
FIG. 16 depicts a schematic cross-sectional view of the FIG. 4A two-piece valve shell body and bonnet structure example, in an example embodiment that includes a wedge-type obturator and seats arrangement with high temperature high density elastomer material seals behind each seat. These seals are compressed by reaction of the normal load developed by springs embedded inside the stem and or located between the stem and obturator or located between the stem and the coupling. The figure depicts the wedge obturator and seats arrangement that slides into position in the body cavity with a motion from the top to the bottom. It is noted that FIG. 17 is a schematic cross-sectional view of the FIG. 4A example two-piece valve shell body and bonnet structure.

FIG. 16 shows a wedge obturator 1602 and seats 1604, 1606 arrangement with both seats showing a slight angular offset a of their respective flow bore with the ball flow bore. This embodiment allows for using a floating ball (e.g., see FIG. 7A), a one-piece ball/stem (e.g., see FIG. 7B) or a trunnion mounted ball (e.g., see FIG. 8). This arrangement eases the assembly and disassembly of the valve.

Figure 9:
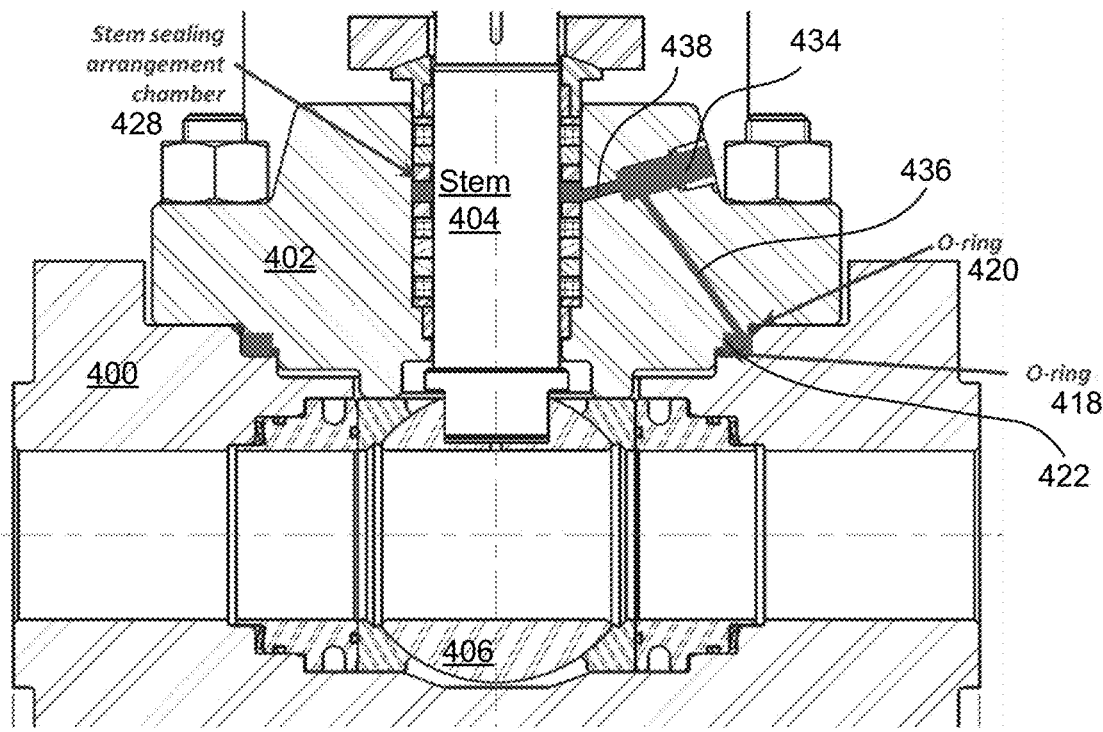
FIG. 9 is an enlarged cross-sectional view of an example embodiment providing hermetic sealing chambers or jackets in the stem sealing arrangement and between the body/bonnet of FIG. 4B.

FIG. 9 provides an expanded cross-section of a portion of the example embodiment of FIG. 4B but now including shading representing the presence of over-pressurized inert gas (e.g., nitrogen) from input port 434 and flowing within internal bonnet passages 436 and 438 to fill the over-pressurized sealing chambers 422 and 428.

Figure 10:
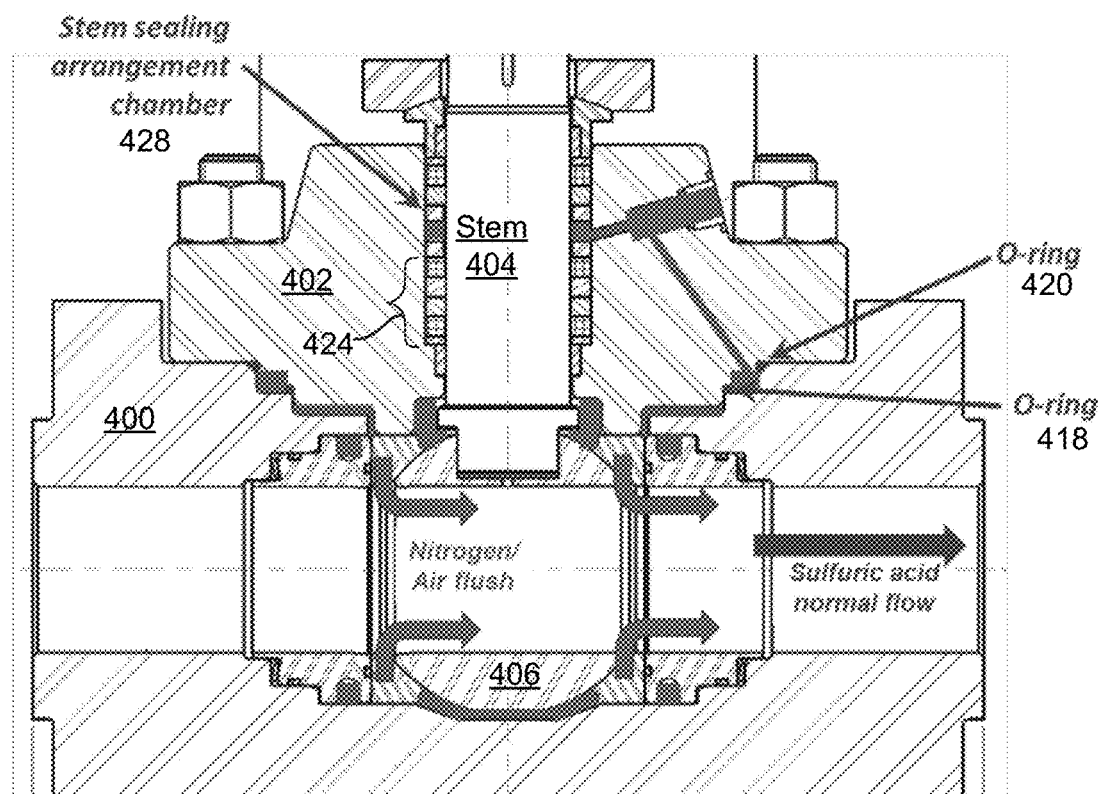
FIG. 10 is an enlarged cross-sectional view of an example embodiment providing hermetic sealing chambers/jackets in (1) the stem sealing arrangement, (2) between the body/bonnet and (3) in the body cavity of FIG. 4B whereby the body cavity jacket can be flushed and cleaned every time the ball strokes open/close or close/open to ensure no sulfuric acid in the body cavity (e.g., which might have entered because the inner-most O-ring may be purposefully slightly damaged, e.g., by a few partial small knife cuts).

FIG. 10 is similar to FIG. 9 but now with shading representing the presence of some over-pressurized inert gas (e.g., nitrogen) flowing past the inner-most sealing gasket structures (e.g., passing through/past a slightly damaged O-ring 418 and through/past the lower gasket packing seal 424) into the inner cavities of the bonnet/body/ball structures so as to present a small inert flushing flow of inert gas into the process flow while positively preventing outward leakage of the normal process flow (e.g., of sulfuric acid). In effect, the example valve of FIG. 10 is hermetically sealed so as to prevent contamination of the ambient environment.

Figure 11:
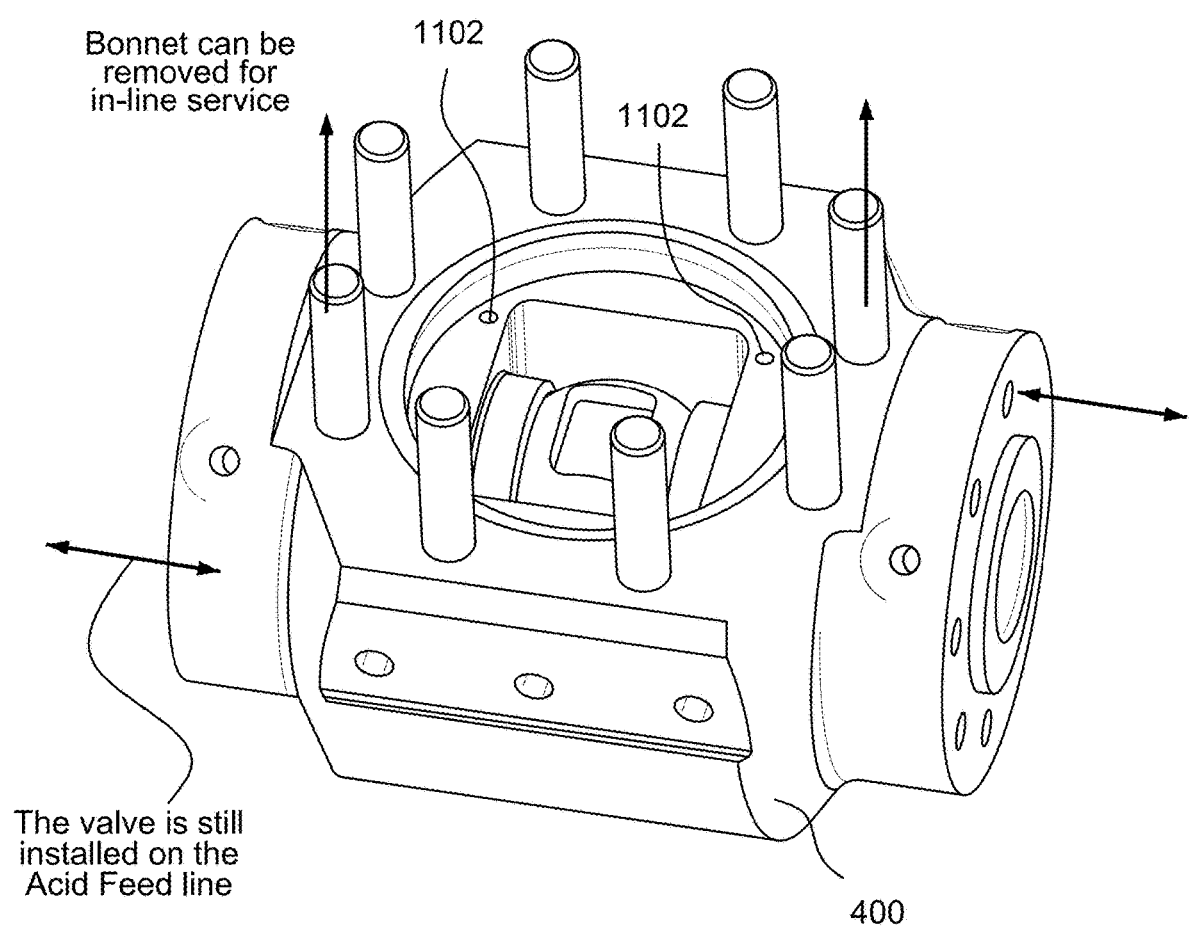
FIG. 11 is an isometric schematic depiction of an example valve body with internals that can be field inspected, disassembled and re-assembled without removing the valve from the acid feed line using a forked tool when the valve is still installed on the acid feed line or without requiring any forked tool when the ball/seats arrangement is wedged.

FIG. 11 provides a view of an example embodiment that has its bonnet removed for inspection/servicing access to the ball and other valve internal structures (including an ability to remove/inspect/replace the ball and seats, seat retainers, and other internal valve structures if present) while the valve body 400 is still connected as installed within the serviced process plumbing (e.g., within an acid feed line). As explained previously, a pair of forked ball/seat installation tools (e.g., see tool 501 in FIG. 12A) interacts with seat retainer grooves 410 and partially misaligned body holes 1102 (a pair of which are disposed at each side of the ball although only one hole of each such pair can be seen in FIG. 11) can be used not only to facilitate initial valve assembly (i.e., before the bonnet is attached to the body) but also to dis-assemble the valve internal components when the bonnet is removed for inspection/servicing as in FIG. 11.

Figure 13A:
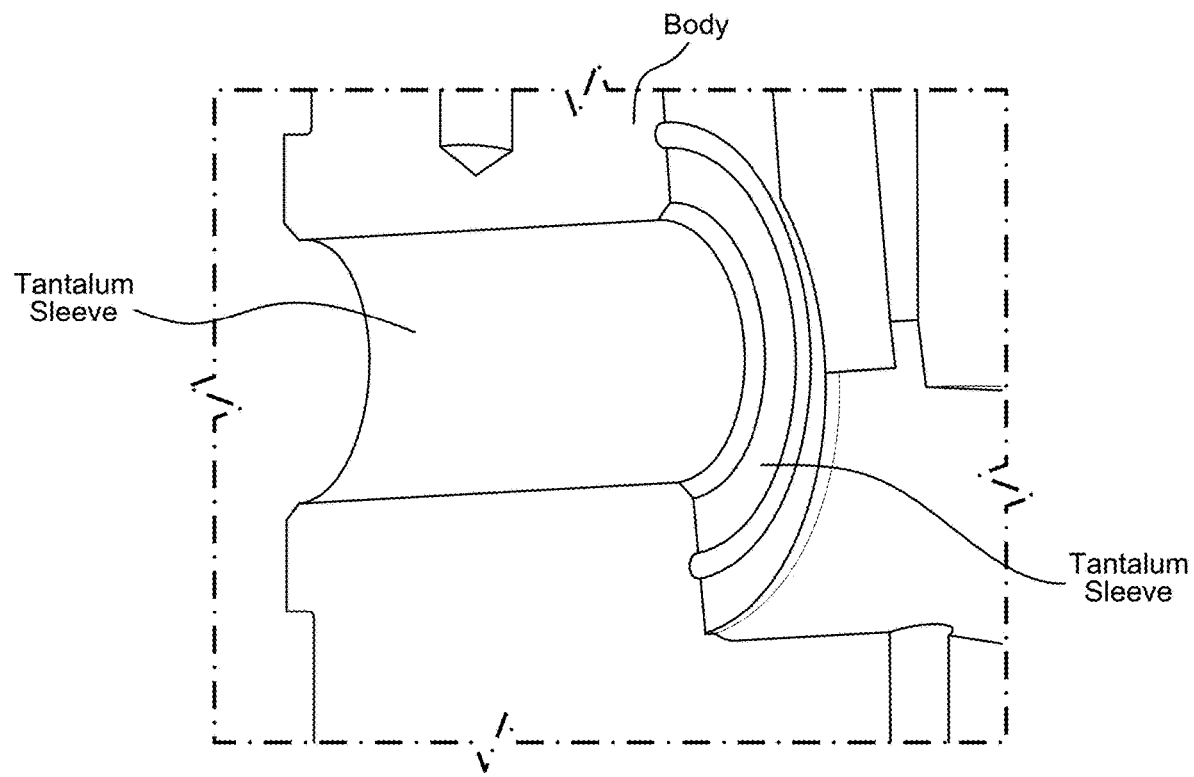
FIG. 13A and FIG. 13B illustrate example embodiments with the tantalum sleeve fixed to the metal (e.g., Alloy 20) valve body in example embodiments.
Figure 13B:
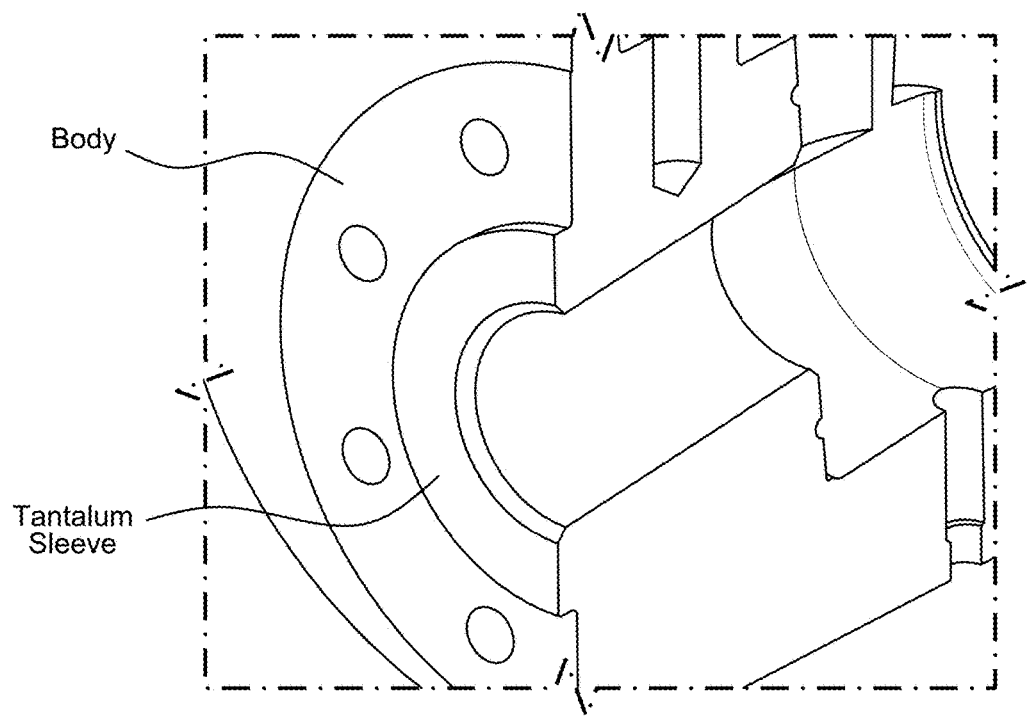

The body and bonnet pieces of all example two-piece valve body examples are each possibly machined from a single block of a suitable hard metal like Alloy 20, a corrosion resistant austenitic stainless steel or similar as may be required for a particular serviced process. Each of the valve body pieces could instead be machined from raw material (either forged or cast) or manufactured from additive manufacturing processes including 3D printing. At least the internal "wetted" surfaces of the valve body, bonnet, ball, seats, seat retainers and the like subjected to a serviced process flow are configured for severe industrial service applications (e.g., HPAL process service and/or similar severe industrial service applications) by applying a surface coating of tantalum (or a similar corrosion resistant metal or metal alloy suited to the serviced process such as, e.g., hot 500° F. pressurized 725 psi 98% sulfuric acid fluid flows), or protected by tantalum sleeves (or a similar corrosion resistant metal or metal alloy), or protected by hard-coating similar to the ones used between ball and seats sealing surfaces, or the combination of the three. The tantalum surface coating may be applied by CVD (chemical vapor deposition) processes or by other processes such as by Multi-Anode Reactive coating processes. The tantalum surface treatment may, for process simplification, include a coating on the entirety of a valve structure surface except for threaded studs/holes which are preferably masked off from surface coating during the CVD process. A tantalum coating of wetted valve surfaces more than 0.002 inch thick can be utilized in this example embodiment. In some embodiments, as noted above, a tantalum sleeve can be fixed to the hard metal (e.g., Alloy 20) body shell using welding and complex geometries. Interconnecting tantalum sleeves can be accomplished by welding between each sleeve. FIGS. 13A and 13B illustrate example embodiments with the tantalum sleeve fixed to the hard metal (e.g., Alloy 20) body. Sleeves of 0.030 inch thickness or more can be used in this example embodiment, to protect the body, key internals, and one or more bonnets of the valve from corrosion. A tantalum sleeve, in comparison to a tantalum coating, may provide improved protection from corrosion.

Figure 14:
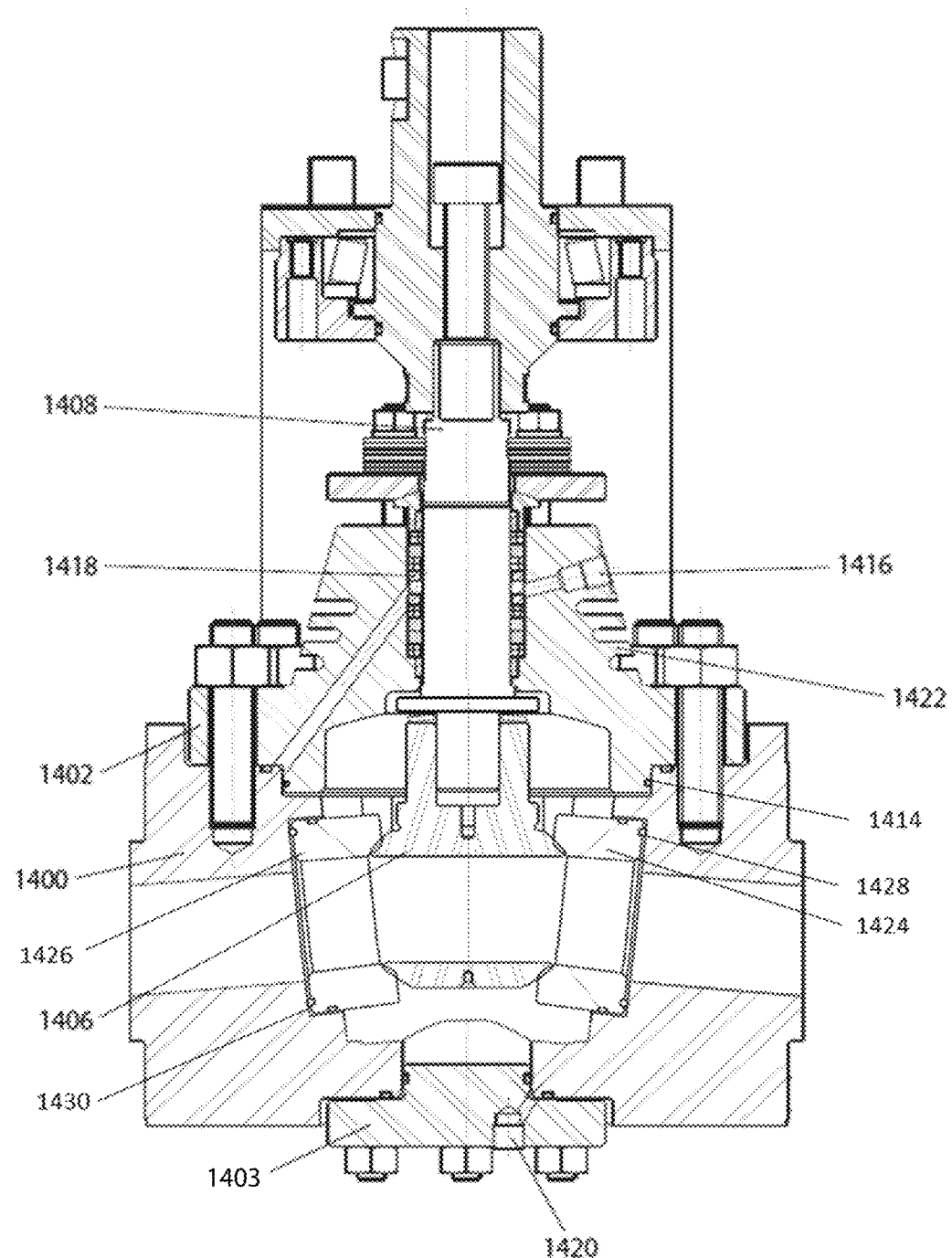
FIG. 14 illustrates an embodiment that includes a wedge obturator and seats arrangement, a primary bonnet and a secondary bonnet, according to some embodiments.
Figure 15A:
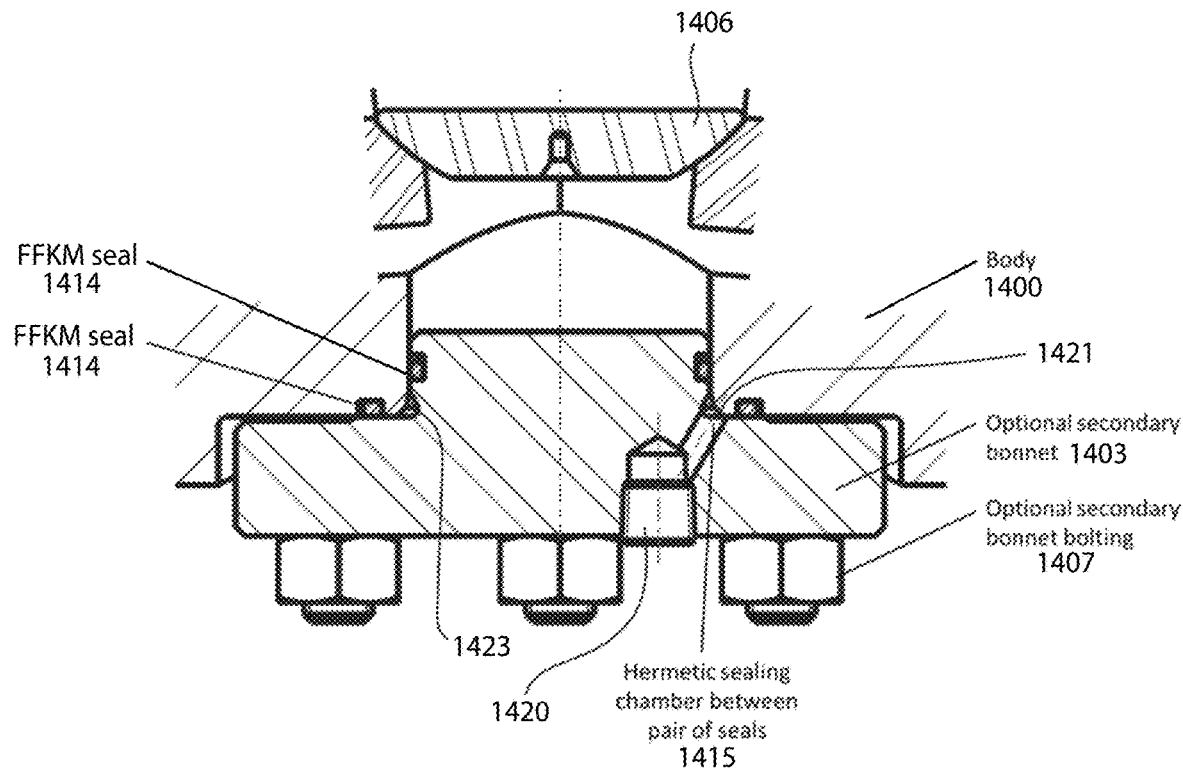
FIG. 15A illustrates a secondary bonnet in accordance with an example embodiment.

When the machining of the valve body and/or the clamping the tantalum sleeve is getting complex in an example embodiment, an optional secondary bonnet facing the primary one can be employed in order to facilitate the machining of the valve body and/or the clamping the tantalum sleeve. FIG. 14 illustrates an example embodiment that is configured with an optional secondary bonnet 1403 that is in addition to the primary bonnet 1402. The example embodiment shown in FIG. 14 may be identical to the embodiments described above except for differences for incorporating the secondary bonnet 1403 and the wedge-type obturato3 1406 of the embodiment of FIG. 14. FIG. 15A provides a more detailed view of the secondary bonnet 1403 as it is arranged to connect to the body 1400 and the bottom of the valve opening area.

Similarly to the primary bonnet 402 described above in example embodiments (the primary bonnet is shown as 1402 in this embodiment), the joint between body 1400 and the secondary bonnet 1403 can be configured to employ two spaced-apart gaskets 1414 (e.g., of the O-ring type made from high temperature high density elastomer material such as FFKM) installed between the body and the secondary bonnet so as to create an inter-gasket chamber (e.g. hermetically sealing chambers each located between a pair of gaskets/seals 1414) that can be suitably pressurized (e.g., with an inert gas such as nitrogen) at a pressure higher than any expected process pressures to positively prevent leakage there-through (e.g., see FIG. 6). The same or similar pressurized chamber geometry as used with respect to the primary bonnet described above can be added between the body and the secondary bonnet in embodiments in which a secondary bonnet is implemented. The secondary bonnet 1403 can be optionally bolted using bolts 1407.

The wedge-type obturator 1406 may be moved downward using a stem 1408 movement. The downward movement of the stem 1408 pushes down on the a spring arrangement, and pushes the seats (see e.g., 1424, 1426 and bottom seats in some embodiments) to the sides such that the seals (see e.g., 1428, 1430) are compressed. By this movement, an inert gas that is entered through opening 1416 can flow to fill an area 1418 around the stem and to the area between the valve body 1400 and the primary bonnet 1402 Similarly, the area between the secondary bonnet 1403 and the body 1400 can also be filled with a pressurized inert gas through opening 1420. The primary bonnet 1402 may include external wings/fins 1422 that increases the surface area between the bonnet and the ambient environment so that excess heat generated by components such as the stem at the sealing with the bonnet can be dissipated faster.

Figure 15B:
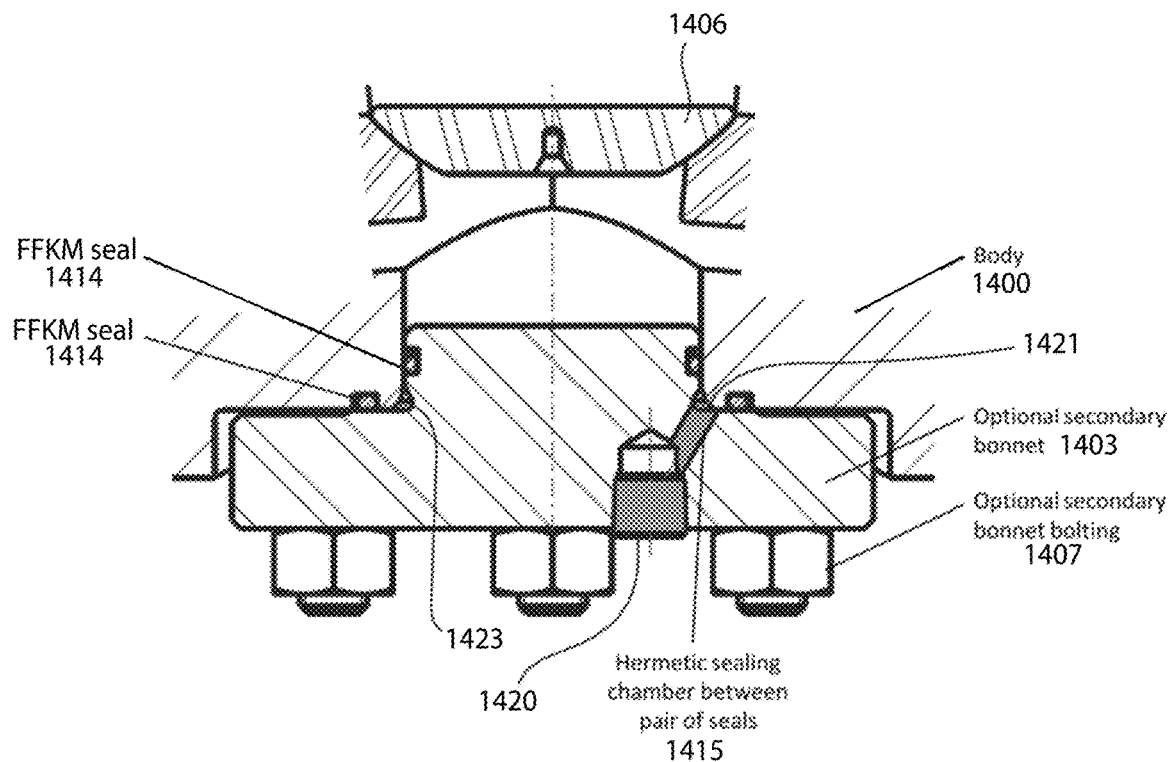
FIG. 15B illustrates over pressurized air injected to provide hermetic sealing chambers or jackets between the body/secondary bonnet, according to an embodiment.

FIG. 15A illustrates an expanded cross-section of a portion of the example embodiment of FIG. 14, and illustrates the secondary bonnet 1403 and the bottom portion of the ball cavity in relation to each other. The figure illustrates an enlarged cross-sectional view of an example embodiment providing hermetic sealing chambers (e.g., 1415) or jackets between the body/secondary bonnet 1403 (it is noted that FIG. 9 above illustrates an enlarged cross-sectional view of an example embodiment providing hermetic sealing chambers or jackets in the stem sealing arrangement and between the body/bonnet of FIG. 4B). FIG. 15B illustrates the expanded cross-section shown in FIG. 15A but including shading representing the presence of over-pressurized inert gas from input port 1420 and flowing within the over-pressurized sealing chambers 1421 and 1423 between the body and secondary bonnet 1403 to prevent leaks. FIG. 14, as noted above, illustrates an example embodiment that includes a primary bonnet and secondary bonnet.

A wedge-type obturator valve portion 1406 as shown in FIG. 14, is shown in more detail in FIG. 16 in an embodiment that does not include a secondary bonnet. FIG. 16 illustrates the wedge obturator 1602 and seats (e.g., 1604 and 1606) arrangement that slides into position in the body cavity with a motion from the top to the bottom. This wedge type embodiment eases the assembly and disassembly of the valve internals. Behind each wedge seat (e.g., 1604, 1606), seals 1608 are compressed to ensure backseat sealing capability. The seals 1608, which as described above with respect to another embodiment, are preferably of the O-ring type, made from high temperature high density elastomer material such as FFKM. The seals 1608, in some embodiments, are compressed using springs between the obturator 1602 and the valve stem 1614 or springs embedded in the stem or embedded in the coupling (e.g., coupling 403) when the stem moves downwards. The springs could be either of spring wire, Belleville washer or flat plate geometry and made of material capable to handle hot (e.g., 500° F.) pressurized (e.g., 725 psi) 98% sulfuric acid fluid flows. In FIG. 16, the wedge obturator 1602 and seats 1604, 1606 arrangement can be seen with both seats showing a slight acute angular offset a 1611 (e.g., between 0 and 25 degrees) of their respective flowbore with the ball flowbore. This embodiment allows for using a floating ball (e.g., see FIG. 7A), a one-piece ball/stem (e.g., see FIG. 7B) or a trunnion mounted ball (e.g., see FIG. 8).

FIG. 17 depicts an example embodiment including a wedge obturator and seats arrangement that slides into position in the body cavity with a motion from the top to the bottom (as illustrated by the dashed arrow). Behind each wedge seat, seals are compressed to ensure backseat sealing capability. The seals are preferably of the O-ring type, made from high temperature high density elastomer material such as FFKM. The seals are compressed using springs between the ball and the stem (e.g., 1612), or springs embedded in the stem and or springs embedded in the coupling 403. These springs could be either of spring wire, Belleville washer or flat plate geometry and made of material capable to handle hot (e.g., 500° F.) pressurized (e.g., 725 psi) 98% sulfuric acid fluid flows.

Figure 18:
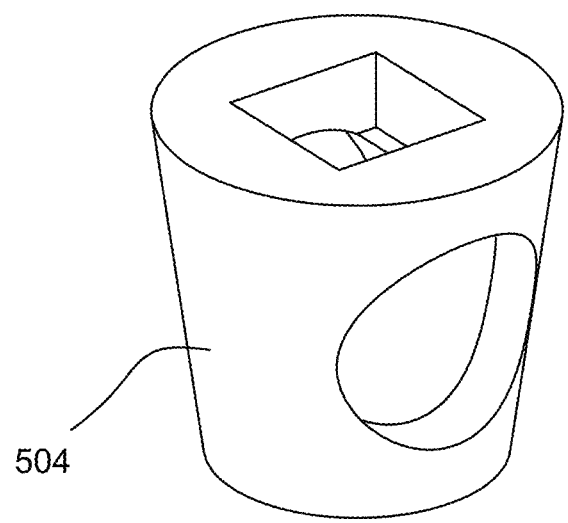
FIG. 18 provides a schematic isometric view of an alternative operating valve plug structure such as a conical or cylindrical plug that can be used instead of an operating valve ball structure in the prior example embodiments.

FIG. 18 provides a schematic isometric view of an alternative internal floating conical/cylindrical plug operating valve structure 504 (i.e., an alternative form of metal valve structure also capable of being rotated so that an included aperture can be aligned to pass a process fluid flow or misaligned to block a process fluid flow) that can be used instead of the floating (or non-floating) ball operating valve structures in other example embodiments. As those in the art will appreciate and understand, when a rotatable plug valve structure is used instead of a rotatable ball valve structure, mated valve seats and seat retainers and the like will be conformed to the plug valve structure instead of the ball valve structure.

Although the above examples have employed a metallic ball 406 and metallic seats 408, in another example these components can be made of ceramic materials or high density elastomer material. Manufacturing these components in ceramic or elastomer materials would have an impact on their envelope dimensions and the overall dimensions of the valve. However the example design concepts can be adjusted to allow for interchanging metallic and ceramic ball and metallic, ceramic and elastomeric seats in the same body of prior examples.

While the invention has been described in connection with what is presently considered to be the most practical and preferred example embodiments, it is to be understood that the invention is not limited to the disclosed example embodiments, but on the contrary, is intended to cover various modifications and equivalent arrangements included within the spirit and scope of the appended claims. As those in the art will appreciate, some individual features of one example embodiment may be also used in another example embodiment.

What is claimed is:

1. A top entry valve for severe industrial applications, said top entry valve comprising:
   a single piece metallic body;
   a rotatable valve structure fitted within said body between valve seats also fitted into said body, said valve seats making sealing engagement with said valve structure, said valve structure having an aperture there-through for passing a fluid flow when in a predetermined open rotational position and for blocking a fluid flow when in a predetermined closed rotational position;
   said body including a top opening sized to accept entry of the valve structure and its associated seats;
   a metal bonnet configured for bolted and sealed connection to the top of said body; and
   a rotatable valve operating stem integral with or operatively connected to the top of said valve structure so as to rotate the valve structure when the stem is rotated;
   wherein said bonnet has an aperture at its top sized to accept a sealed upper portion of said stem;
   wherein said bonnet is configured with external fins to dissipate heat and reduce a temperature of a sealing between bonnet and the stem.

2. The top entry valve of claim 1 wherein the sealed connection between the body and bonnet comprises a pair of spaced-apart seals.

3. The top entry valve of claim 1 wherein the upper portion of the stem sealed with respect to the bonnet comprises a pair of rotor seals circumferentially disposed around the rotatable stem and spaced-apart axially along the stem.

4. The top entry valve of claim 1 wherein all internal surfaces of the body, bonnet, ball and seats which are configured to be wetted by a valve process fluid are coated with material resistant to hot pressurized sulfuric acid fluid flows.

5. The top entry valve of claim 1 wherein said valve structure is a ball-shaped structure having an aperture there-through for passing a valved process fluid.

6. The top entry valve of claim 5, wherein said ball shaped structure is of wedge-type with an acute angle offset between inlet/outlet body bores and the bore of the ball shaped structure and the same acute angle offset between the bore of the ball shaped structure and body surfaces where said valve seats make sealing engagement.

7. The top entry valve of claim 1 hermetically sealable against valved process flow leakage, wherein:
- a sealed connection between the body and bonnet comprises a pair of spaced-apart O-rings forming a chamber there-between connected to an input port for a pressurized gas and an O-ring situated closest to the valve structure is configured to pass pressurized gas onward toward the valve structure and internal valve cavities;
- a sealed connection between an upper portion of the stem with respect to the bonnet comprises a pair of rotor seals circumferentially disposed around the rotatable stem and spaced-apart axially along the stem to form a chamber there-between connected to an input port for a pressurized gas and a chamber is configured to pass pressurized gas onward toward the valve structure and internal valve cavities.

8. The top entry valve of claim 1 including internal movable members spring-loaded towards the center of the valve and including structures partially mis-aligned with holes in the body such that, when installation tool projections are inserted through the partially misaligned holes in the body, the internal movable members are forced outwardly to provide clearance for insertion or removal of at least the valve structure through the open top of the body.

9. The top entry valve of claim 1 wherein said body and bonnet are bolted together with threaded stud and threaded nut connections.

10. The top entry valve of claim 1 wherein the valve structure is a rotatable cylindrical/conical plug structure.

11. The top entry valve of claim 1 further comprising a valve operating torque monitoring transducer coupled to said stem or a connected valve operating coupling or an encompassing bracket though which the stem or a connected valve operating coupling passes, said transducer being configured to measure valve operating torque.

12. The top entry valve of claim 1 further comprising at least one acoustic transducer mounted on said body and/or on said bonnet and configured to detect acoustic signals caused by fluid leakage past at least one of said valve seats.

13. A top entry valve for severe industrial applications, said top entry valve comprising:
- a single piece metallic body;
- a rotatable valve structure fitted within said body between valve seats also fitted into said body, said valve seats making sealing engagement with said valve structure, said valve structure having an aperture there-through for passing a fluid flow when in a predetermined open rotational position and for blocking a fluid flow when in a predetermined closed rotational position;
- said body including a top opening sized to accept entry of the valve structure and its associated seats;
- a first metal bonnet configured for bolted and sealed connection to the top of said body;
- a rotatable valve operating stem integral with or operatively connected to the top of said valve structure so as to rotate the valve structure when the stem is rotated; and
- a second metal bonnet configured for bolted and sealed connection to a bottom of said body,
- wherein said first bonnet has an aperture at its top sized to accept a sealed upper portion of said stem,
- wherein said body includes a bottom opening that is covered by the connected second bonnet,
- wherein said first bonnet is configured with external fins to dissipate heat and reduce a temperature of a sealing between bonnet and the stem.

14. The top entry valve of claim 13, wherein the sealed connection between the body and the second bonnet comprises a pair of spaced-apart seals.

15. The top entry valve of claim 14, wherein the second bonnet is configured with a chamber that is configured to pass pressurized gas toward a cavity between the spaces apart seals.

16. The top entry valve of claim 13, wherein said valve structure is a ball-shaped structure having an aperture there-through for passing a valved process fluid.

17. The top entry valve of claim 16, wherein said ball shaped structure is of wedge-type with an acute angle offset between inlet/outlet body bores and the bore of the ball shaped structure and the same acute angle offset between the bore of the ball shaped structure and body surfaces where said valve seats make sealing engagement.

18. The top entry valve of claim 13, wherein a tantalum sleeve is attached to said body.

* * * * *